(12) United States Patent
Jang et al.

(10) Patent No.: US 12,302,012 B2
(45) Date of Patent: May 13, 2025

(54) METHOD OF OPERATING AN IMAGE SENSOR

(71) Applicant: SAMSUNG ELECTRONICS CO., LTD., Suwon-si (KR)

(72) Inventors: Chanyoung Jang, Suwon-si (KR); Hee Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 17/987,537

(22) Filed: Nov. 15, 2022

(65) Prior Publication Data

US 2023/0156353 A1 May 18, 2023

(30) Foreign Application Priority Data

Nov. 15, 2021 (KR) .......................... 10-2021-0157088
May 11, 2022 (KR) .......................... 10-2022-0057932

(51) Int. Cl.
*H04N 25/46* (2023.01)
*G06V 10/25* (2022.01)
*G06V 10/74* (2022.01)
*H04N 25/443* (2023.01)
*H04N 25/445* (2023.01)

(52) U.S. Cl.
CPC ............. *H04N 25/46* (2023.01); *G06V 10/25* (2022.01); *G06V 10/761* (2022.01); *H04N 25/443* (2023.01); *H04N 25/445* (2023.01)

(58) Field of Classification Search
CPC .... H04N 25/46; H04N 25/443; H04N 25/445; H04N 25/133; H04N 25/135; G06V 10/25; G06V 10/761
See application file for complete search history.

(56) References Cited

U.S. PATENT DOCUMENTS

| 7,616,241 | B2 | 11/2009 | Nam |
| 8,045,033 | B2 | 10/2011 | Honda et al. |
| 8,436,925 | B2 * | 5/2013 | Hirota .................. H04N 9/646 |
| | | | 348/279 |
| 8,666,162 | B1 * | 3/2014 | Vakrat .................. G06T 3/4015 |
| | | | 382/167 |
| 8,768,053 | B2 | 7/2014 | Choe et al. |

(Continued)

FOREIGN PATENT DOCUMENTS

| KR | 10-2021-0114313 A | 9/2021 |
| WO | 2011-023229 A1 | 3/2011 |

*Primary Examiner* — Albert H Cutler
(74) *Attorney, Agent, or Firm* — Sughrue Mion, PLLC

(57) ABSTRACT

A method of operating an image sensor, the image sensor including a pixel array of a plurality of red pixels, a plurality of green pixels, a plurality of blue pixels, and a plurality of white pixels, includes selecting a first green pixel and a second green pixel arranged on a first axis parallel to a first diagonal direction, selecting a third green pixel and a fourth green pixel arranged on a second axis parallel to a second diagonal direction, generating a first green binning pixel by performing a first diagonal binning operation on the first green pixel and the second green pixel, generating a second green binning pixel by performing a second diagonal binning operation on the third green pixel and the fourth green pixel, and generating image data corresponding to the first green binning pixel and the second green binning pixel.

8 Claims, 17 Drawing Sheets

(56) References Cited

U.S. PATENT DOCUMENTS

| | | | |
|---|---|---|---|
| 9,001,233 B2 | 4/2015 | Kasai | |
| 9,584,742 B2 | 2/2017 | Park et al. | |
| 9,628,725 B2 | 4/2017 | Roh et al. | |
| 9,686,485 B2 | 6/2017 | Agranov et al. | |
| 9,699,429 B2 | 7/2017 | Kaizu | |
| 10,594,962 B2 | 3/2020 | Kang | |
| 10,609,348 B2* | 3/2020 | Agranov | H04N 25/134 |
| 2008/0084341 A1* | 4/2008 | Boemler | H04N 25/46 |
| | | | 348/E9.01 |
| 2015/0237314 A1* | 8/2015 | Hasegawa | H04N 25/135 |
| | | | 348/279 |
| 2020/0295096 A1 | 9/2020 | Min et al. | |
| 2021/0409624 A1* | 12/2021 | Powell | H04N 25/46 |

* cited by examiner

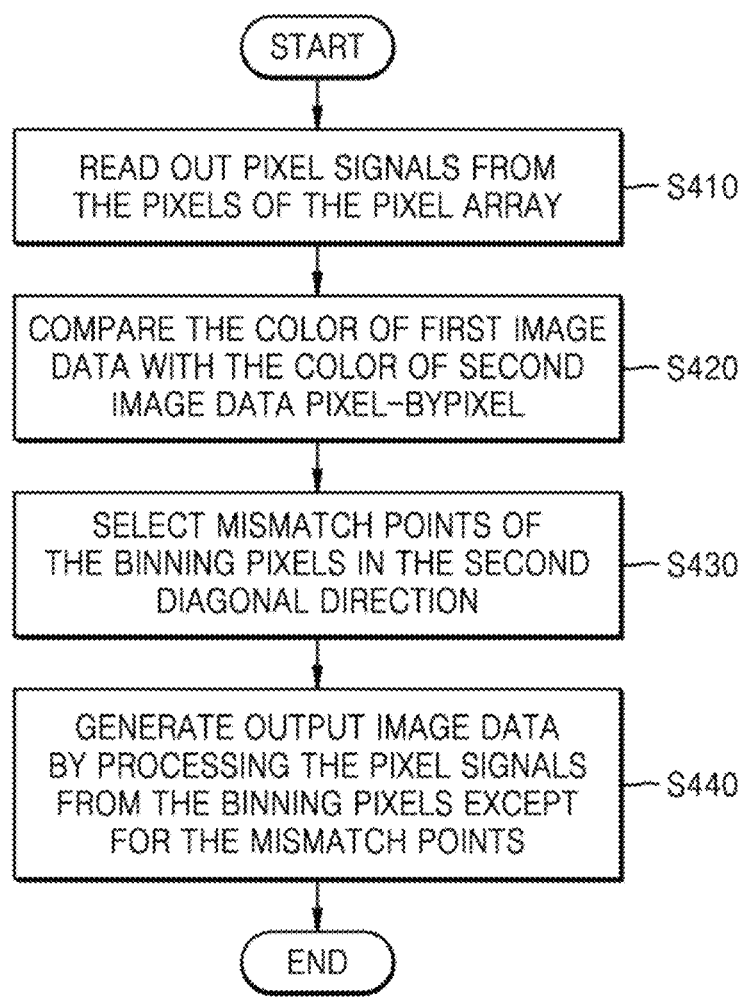

METHOD OF OPERATING AN IMAGE SENSOR

CROSS-REFERENCE TO RELATED APPLICATIONS

This application is based on and claims priority under 35 U.S.C. § 119 to Korean Patent Application No. 10-2022-0057932, filed on May 11, 2022, and Korean Patent Application No. 10-2021-0157088, filed on Nov. 15, 2021, in the Korean Intellectual Property Office, the disclosures of which are incorporated by reference herein in their entireties.

BACKGROUND

The present disclosure relates to a method of operating an image sensor, and more particularly, to a method of performing pixel binning on pixels of the image sensor.

Pixel binning technology has been used to combine a plurality of pixel signals from a pixel array into a virtual single signal. Thus, the amount of data for an output image can be reduced by the pixel binning technology in image sensors. In the related art, pixel binning has been mainly performed by a Bayer binning process in which the color spectrums of a raw Bayer pattern are combined according to preset pixel binning criteria.

However, according to the related art pixel binning, as the gap distances between the sampling points of the binning pixels are different from one another, false colors and/or zigzag-shaped noise usually occurs in the output images.

SUMMARY

Provided are methods of operating image sensors for reducing the false colors and/or zigzag-shaped noise from output images by a pixel binning processes.

Additional aspects will be set forth in part in the description which follows and, in part, will be apparent from the description, or may be learned by practice of the presented embodiments.

According to an aspect of an example embodiment, a method of operating an image sensor, the image sensor including a pixel array of a plurality of red pixels, a plurality of green pixels, a plurality of blue pixels, and a plurality of white pixels, may include selecting a first green pixel and a second green pixel arranged on a first axis parallel to a first diagonal direction, selecting a third green pixel and a fourth green pixel arranged on a second axis parallel to a second diagonal direction, generating a first green binning pixel by performing a first diagonal binning operation on the first green pixel and the second green pixel, generating a second green binning pixel by performing a second diagonal binning operation on the third green pixel and the fourth green pixel, and generating image data corresponding to the first green binning pixel and the second green binning pixel.

According to an aspect of an example embodiment, a method of operating an image sensor, the image sensor including a pixel array of a plurality of red pixels, a plurality of green pixels, a plurality of blue pixels, and a plurality of white pixels, may include generating a rhombus green binning area by selecting a first green pixel, a second green pixel, a third green pixel, and a fourth green pixel from the pixel array, the first green pixel, the second green pixel, the third green pixel, and the fourth green pixel being positioned at corners of a rhombus, performing a rhombus pixel binning operation on the rhombus green binning area, and generating image data from the first green pixel, the second green pixel, the third green pixel, and the fourth green pixel.

According to an aspect of an example embodiment, a method of operating an image sensor, the image sensor including a plurality of red pixels, a plurality of green pixels, a plurality of blue pixels, and a plurality of white pixels that are arranged in a plurality of pixel columns and a plurality of pixel rows, may include selecting a first red pixel and a second red pixel from a first pixel column, selecting a third red pixel from a first pixel row positioned at a midpoint between the first red pixel and the second red pixel, generating a first isosceles triangular binning area, wherein the first red pixel, the second red pixel and the third red pixel are positioned at corners of the first isosceles triangular binning area, generating a red binning pixel by performing a red pixel binning operation on the first isosceles triangular binning area, selecting a first blue pixel and a second blue pixel from a second pixel column, selecting a third blue pixel from a second pixel row positioned at a midpoint between the first blue pixel and the second blue pixel, generating a second isosceles triangular binning area, wherein the first blue pixel, the second blue pixel, and the third blue pixel are positioned at corners of the second isosceles triangular binning area, generating a blue binning pixel by performing a blue pixel binning operation on the second isosceles triangular binning area, and generating image data from the red binning pixel and the blue binning pixel.

BRIEF DESCRIPTION OF THE DRAWINGS

The above and other aspects, features, and advantages of certain example embodiments of the present disclosure will be more apparent from the following description taken in conjunction with the accompanying drawings, in which:

FIG. 8 is a flowchart of a method of selecting mismatch points from the image data according to an example embodiment of the disclosure;

DETAILED DESCRIPTION

Figure 1:
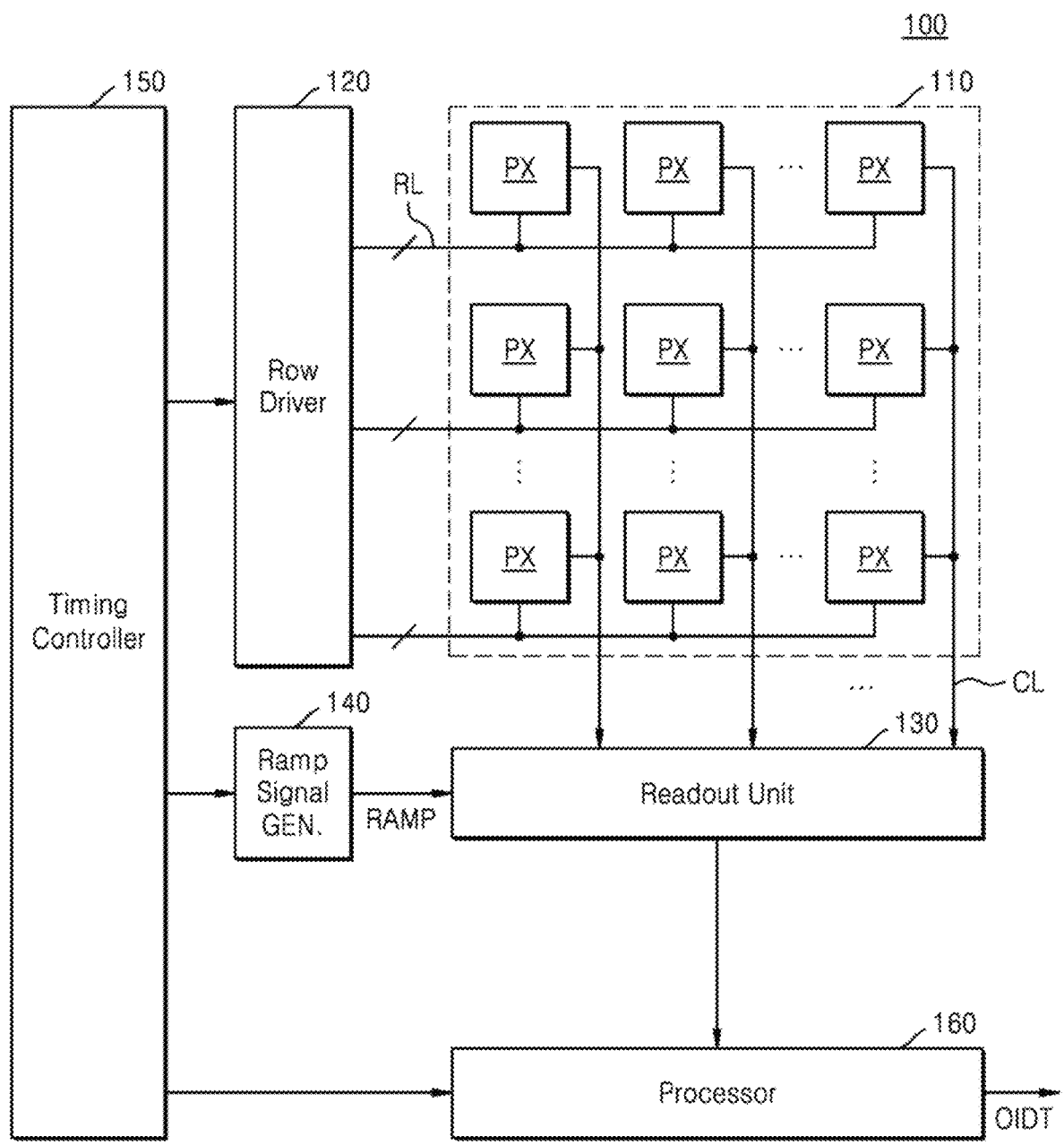
FIG. 1 is a block diagram of an image sensor according to an example embodiment of the disclosure.

FIG. 1 is a block diagram of an image sensor according to an example embodiment of the disclosure.

Referring to FIG. 1, an image sensor 100 may include a pixel array 110, a row driver 120, a readout unit 130, a ramp signal generator 140, a timing controller 150, and an image processor 160.

The pixel array 110 may include a plurality of pixels PX arranged into a matrix, a plurality of row lines RL connected to a plurality of the pixels PX in every row, respectively, and a plurality of column lines CL. Each of the pixels PX may include at least one photoelectric conversion element (which may be referred to as photo detective element). The photoelectric conversion element may detect light and the detected light may be converted into photo electrons in the photoelectric conversion element. In an example embodiment, the photoelectric conversion element may include a photo detective element that includes organic materials or inorganic materials. Examples of the photoelectric conversion element may include an inorganic photo diode, an organic photo diode, a perovskite photo diode, a photo transistor, a photo gate, a pined photo diode, etc. In an example embodiment, each of the pixels PX may include a plurality of photoelectric conversion elements. The plurality of the photoelectric conversion elements may be arranged on the same layer, or may be stacked in a vertical direction.

A plurality of micro lenses may be disposed over a plurality of pixels PX, respectively, or may be disposed over a plurality of pixel groups, respectively. A pixel group may include a number of neighboring pixels. Each of the pixels PX may detect a specific filter light that may be filtered from the light passing through the micro lenses to have a specific spectrum.

The pixel array 110 according to an example embodiment may include the plurality of pixels PX generating a red-green-blue (RGB) pattern or a red-green-blue-warm white-cool white (RGBWC) pattern. In an example embodiment, the pixel array 110 may include a plurality of red pixels converting red light having a red spectrum into electric signals, a plurality of green pixels converting green light having a green spectrum into electric signals and a plurality of blue pixels converting blue light having a blue spectrum into electric signals. Furthermore, the pixel array 110 may include a plurality of white pixels converting mixture light of red, green and blue spectrums into electric signals. A plurality of color filters may be disposed over each of the pixels PX, thus the specific filter light having the specific spectrum may only pass through the corresponding color filter. However, the pixel array 110 is not limited to the above-described structures, and may further include additional pixels for detecting any other light having a spectrum different from the red, green and blue spectrums.

In an example embodiment of the disclosure, each of the pixels PX may be configured into a multilayer structure. A multilayered pixel PX may include a plurality of photo detective elements that may be vertically stacked and may convert incident light having various spectra into various electric signals depending on each spectrum. Thus, each photo detective element may generate its own electrical signal corresponding to a specific color or a specific spectrum of the incident light. That is, a plurality of electrical signals corresponding to a plurality of colors, respectively, may be generated from a single pixel PX.

Furthermore, the pixel array 110 may include a plurality of row lines RL and a plurality of column lines CL. Each of the row lines RL may extend in a row direction and may be connected to a plurality of pixels PX that may be arranged in the row direction around the corresponding row line RL (which may be referred to as pixel row). In an example embodiment, each of the row lines RL may transfer control signals to the pixels PX in the same row from the row driver 120. The control signals may be simultaneously transferred to a plurality of transistors of each pixel PX in the same row.

Each of the column lines CL may extend in a column direction, and a plurality of pixels PX may be arranged in the column direction around the corresponding column line CL (which may be referred to as pixel column). Each of the column lines CL may receive a plurality of pixel signals from the pixels PX in the same corresponding pixel row and may transfer the pixel signals to the readout unit 130 by the pixel row. The pixel signal may include a reset signal and a sensing signal generated from each pixel PX.

The row driver 120 may generate the control signals for driving the pixel array 110 under control by the timing controller 150, and may transfer the control signals to each of the pixels PX through a plurality of the row lines RL. The row driver 120 may control the pixels PX to detect the incident light simultaneously by the pixel array 110 entirely or by the pixel row. Furthermore, the row driver 120 may select the pixels PX from the pixel array 110 by the single pixel row or by the row group having at least two pixel rows, and may control the pixel signals of the selected pixels PX to pass out through a plurality of column lines CL.

The readout unit 130 may read out a plurality of the pixel signals from a plurality of pixels PX in the pixel row(s) selected by the row driver 120, and may convert analogue pixel signals into a plurality of digital pixel values. The readout unit 130 may include an analog-digital converter (ADC) circuit, and the pixel value may be generated as digital data by the ADC circuit. Hereinafter, a physical segment of the readout unit 130 having the ADC circuit is referred to as an ADC block.

The pixel signals may be detected from the pixel array 110 by the column lines CL and the readout unit 130 may convert the pixel signals into digital data based on ramp signals RAMP generated from the ramp signal generator 140. Thus, the readout unit 130 may generate first image data or raw image data by the pixel row.

The readout unit 130 may include a plurality of ADC blocks corresponding to every column line CL. Each ADC block may receive the pixel signals from pixels PX in the corresponding column line CL and may compare the pixel signals with the ramp signals RAMP, to thereby obtain the digital pixel value from the comparison results between the pixel signals and the ramp signals RAMP. In an example embodiment, the ADC block may remove reset signals from the sensing signals by a correlated doubling sampling process. The ADC block may generate the pixel value indicating a light intensity of the light detected at the pixel PX.

The ramp signal generator 140 may generate the ramp signals RAMP having a positive or negative slope and may transfer the ramp signals RAMP to the readout unit 130.

The timing controller 150 may control the operation timings of the row driver 120, the readout unit 130, the ramp signal generator 140, and the image processor 160 in the image sensor 100. Thus, the timing signals may be applied to the row driver 120, the readout unit 130, the ramp signal generator 140 and the image processor 160 at a proper operation time by the timing controller 150.

The image processor 160 may receive a plurality of pixel values from the readout unit 130 and may process the plurality of pixel values, to thereby generate the output image. The image processor 160 may perform a data treatment process on image data, such as image quality compensation, pixel binning and downsizing. Thus, the raw image data may be processed into output image data OIDT by the image processor 160, and the output image data OIDT may be output from the image sensor 100.

In an example embodiment, the image processor 160 may perform the data treatment process on the image data by the color. In an example embodiment, when the image data includes the pixel values of red, green, and blue pixels, the image processor 160 may perform a parallel data process or a serial data process on the red, green, and blue pixels. Furthermore, the image processor 160 may perform the parallel data process on the image data by the color and may include a plurality of processing circuits.

The image processor 160 may perform a pixel binning process on the pixels PX of the pixel array 110, to thereby reduce the data size for the output image data OIDT.

The output image data OIDT may be transferred to an external processor, for example, an application processor, and the external processor may store the output image data OIDT, perform a data processing on the output image data OIDT and display the output image data OIDT on a screen.

According to an example embodiment of the disclosure, in the image sensor 100, a plurality of pixel signals may be simultaneously read out from the pixels PX in any one area shape of a slash, a back slash, a rhombus, a square and an isosceles triangle on the pixel array 110 and may be summed up in an analog way. The image data may be generated by the analog signal summation, and the image processor 160 may perform the pixel binning on the image data. Thus, the amount of data for the output image data OIDT may be reduced by the pixel binning, and the false color and the zigzag-shaped noise caused by the sampling frequency difference may also be alleviated by the pixel binning.

The image sensor 100 may be installed to various electric devices detecting light and images. In an example embodiment, the image sensor 100 may be installed to digital cameras, smartphones, wearable devices, devices for internet of things (IoT), electronic home appliances, tablets, personal computers (PC), personal digital assistants (PDA), portable multimedia players (PMP), digital navigation systems, drones, advanced driver assistance systems (ADAS), etc. In addition, the image sensor 100 may also be installed to various electric components of automobiles, furniture, manufacturing equipment, doors, measuring instruments, etc.

Hereinafter, the pixel binning is described in detail with reference to FIGS. 2 to 4 according to an example embodiment of operating the image sensor in the disclosure. Hereinafter, the pixel binning may be performed by the image processor 160.

Figure 2:
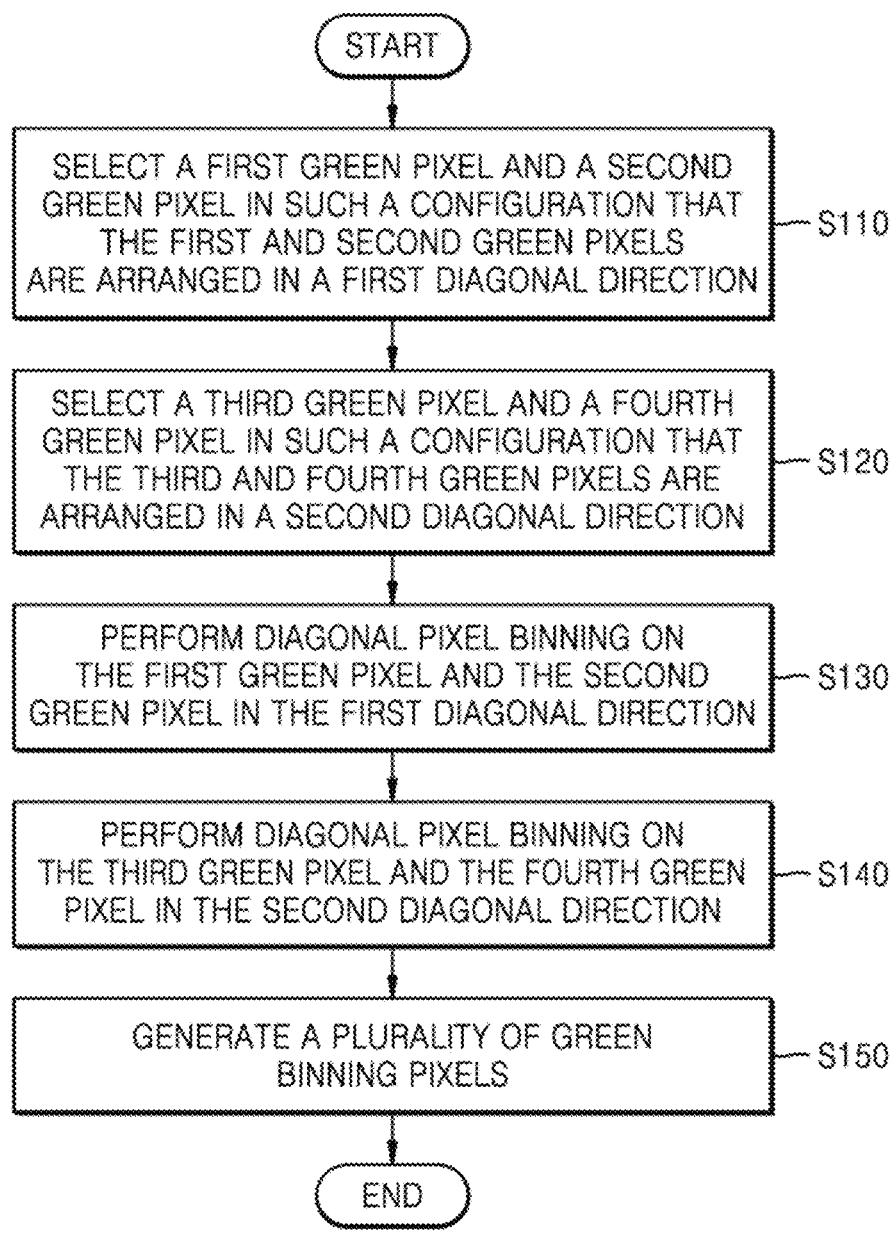
FIG. 2 is a flowchart of a method of generating a plurality of green binning pixels according to an example embodiment of the disclosure.

FIG. 2 is a flowchart of a method of generating a plurality of green binning pixels according to an example embodiment of the disclosure.

Referring to FIG. 2, in operation S110, a first green pixel and a second green pixel may be selected from the pixel array 110 in such a configuration that the first and second green pixels may be arranged on an axis parallel to a first diagonal direction. The first diagonal direction may be defined as a slash direction. The slash direction may be directed at an angle of about 45° counterclockwise from the row line RL of the pixel array 110. In an example embodiment, one pixel may be positioned between the first and second green pixels in the slash direction, although the pixel number between the first and second green pixels is not limited to one.

In operation S120, a third green pixel and a fourth green pixel may be selected from the pixel array 110 in such a configuration that the third and fourth green pixels may be arranged on an axis parallel to a second diagonal direction. The second diagonal direction may be defined as a back slash direction. The back slash direction may be directed at an angle of about 135° counterclockwise from the row line RL of the pixel array 110. In the present example embodiment, one pixel may be positioned between the third and fourth green pixels in the back slash direction, although the pixel number between the third and fourth green pixels is not limited to one.

In operation S130, diagonal pixel binning may be performed on the first and second green pixels arranged in the first diagonal direction. Hereinafter, the pixel binning performed on the pixels in a diagonal direction may be referred to as diagonal pixel binning. Operation S130 may be performed after completion of the selection of the first and the second green pixels.

In operation S140, diagonal pixel binning may be performed on the third green pixel and the fourth green pixel in the second diagonal direction. Operation S140 may be performed after completion of the selection of the third green pixel and the fourth green pixel are selected. The diagonal pixel binning may be performed on the first and second green pixels, to generate a green binning pixel that may be positioned at a midpoint of the first and second green pixels in the first diagonal direction. In addition, the diagonal pixel binning may be performed on the third and fourth green pixels, to generate a green binning pixel that may be positioned at a midpoint of the third and fourth green pixels in the second diagonal direction.

In operation S150, a plurality of green binning pixels may be virtually generated corresponding to all the actual green pixels of the pixel array 110. Operation S150 may be performed based on the diagonal pixel binning being completed on a plurality of the first and second green pixels arranged in the first diagonal direction and on a plurality of the third and fourth green pixels arranged in the second direction across the pixel array 110, entirely. In an example embodiment, the green binning pixels may be a half of the actual green pixels of the pixel array 110. However, the number of green binning pixels is not limited to a half of the actual green pixels.

As the number of green binning pixels may be less than that of the actual green pixels, the amount of data for the output image data OIDT may be sufficiently reduced and the false color and the zigzag-shaped noise caused by the sampling frequency difference may also be alleviated. In addition, according to an example embodiment, the diagonal pixel binning may also be performed on the red pixels and the blue pixels that may be arranged in the binning areas in the first and second diagonal directions, to thereby generate a plurality of red binning pixels and a plurality of blue binning pixels. The binning areas in the first diagonal direction and the second diagonal direction are described in detail with reference to FIGS. 5A and 5B hereinafter.

Figure 3:
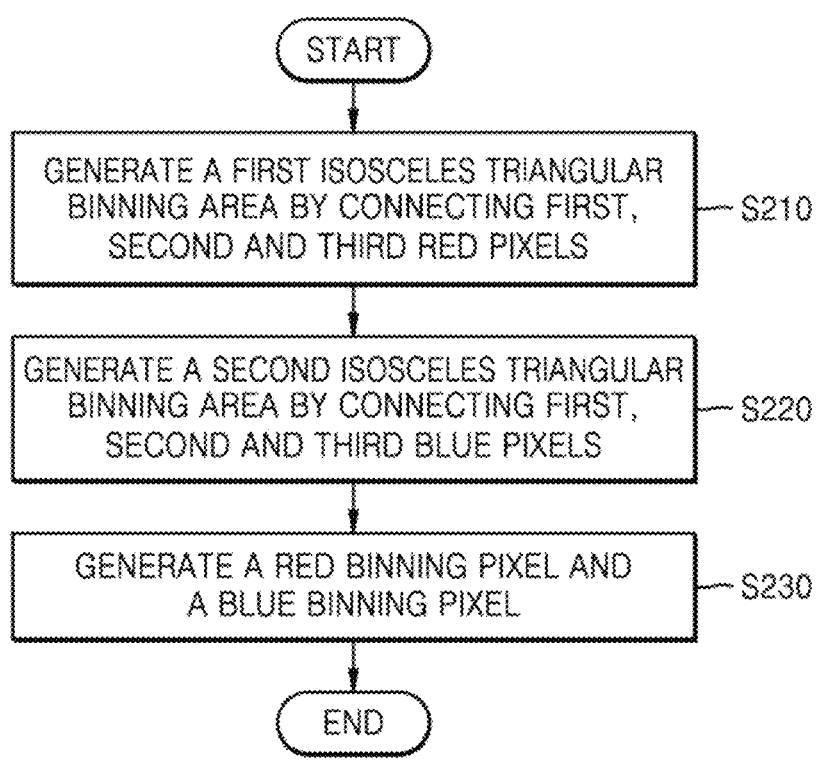
FIG. 3 is a flowchart of a method of generating a plurality of red binning pixels and a plurality of blue binning pixels according to an example embodiment of the disclosure.

FIG. 3 is a flowchart of a method of generating a plurality of red binning pixels and a plurality of blue binning pixels according to an example embodiment of the disclosure.

Referring to FIG. 3, in operation S210, a first isosceles triangular binning area may be generated by connecting a first red pixel, a second red pixel, and a third red pixel according to an example embodiment.

In the first isosceles triangular binning area, the first and second red pixels may be arranged in the same pixel column and the third red pixel may be arranged aside from the first and second pixels in a different pixel column. In an example embodiment, the first red pixel may be arranged at a cross point of the first pixel column and the first pixel row, and the second red pixel may be arranged at a cross point of the first pixel column and the second pixel row. In addition, the third red pixel may be arranged at a cross point of the second pixel column and the third pixel row. The third pixel row may be positioned at a midpoint of the first pixel row and the second pixel row. In an example embodiment, three pixels may be arranged between the first pixel row and the second pixel row, and one pixel may be arranged between the first pixel column and the second pixel column.

In an example embodiment, the first pixel row may be substantially perpendicular to the first pixel column and may be positioned at a midpoint of the first red pixel and the second red pixel. In addition, when the first red pixel and the second red pixel are arranged in the first pixel row, the third red pixel may be positioned in the first pixel column. In an example embodiment, the first pixel column may be substantially perpendicular to the first pixel row and may be positioned at a midpoint of the first red pixel and the second red pixel. Three pixels may be arranged between the first red pixel and the second red pixel. In addition, one pixel may be arranged between the first pixel column and the third red pixel.

In operation S220, a second isosceles triangular binning area may be generated by connecting a first blue pixel, a second blue pixel, and a third blue pixel according to an example embodiment.

In an example embodiment, the first and second blue pixels may be arranged in the second pixel column, and the third blue pixel may be arranged in the second pixel row. In an example embodiment, the second pixel row may be substantially perpendicular to the second pixel column and may be positioned at a midpoint of the first blue pixel and the second blue pixel. In addition, when the first blue pixel and the second blue pixel are arranged in the second pixel row, the third blue pixel may be arranged in the second pixel column. In an example embodiment, the second pixel column may be substantially perpendicular to the second pixel row and may be positioned at a midpoint of the first blue pixel and the second blue pixel. Three pixels may be arranged between the first blue pixel and the second blue pixel. In addition, one pixel may be arranged between the second pixel column and the third blue pixel.

In operation S230, pixel binning may be performed on the first isosceles triangular binning area to thereby generate a red binning pixel, and the pixel binning may be performed on the second isosceles triangular binning area to thereby generate a blue binning pixel. Hereinafter, the pixel binning performed on the isosceles triangular binning area is referred to as an isosceles pixel binning. When the isosceles pixel binning is performed on the red pixels and the blue pixels, the pixel binning on white pixels and blue pixels may be performed in a square binning area having a size of 3 pixels by 3 pixels. Hereinafter, the pixel binning performed on the square binning area is referred to as a square pixel binning. The isosceles triangular binning area and the square binning area are described in detail with reference to FIGS. 6A and 6B hereinafter.

Figure 4:
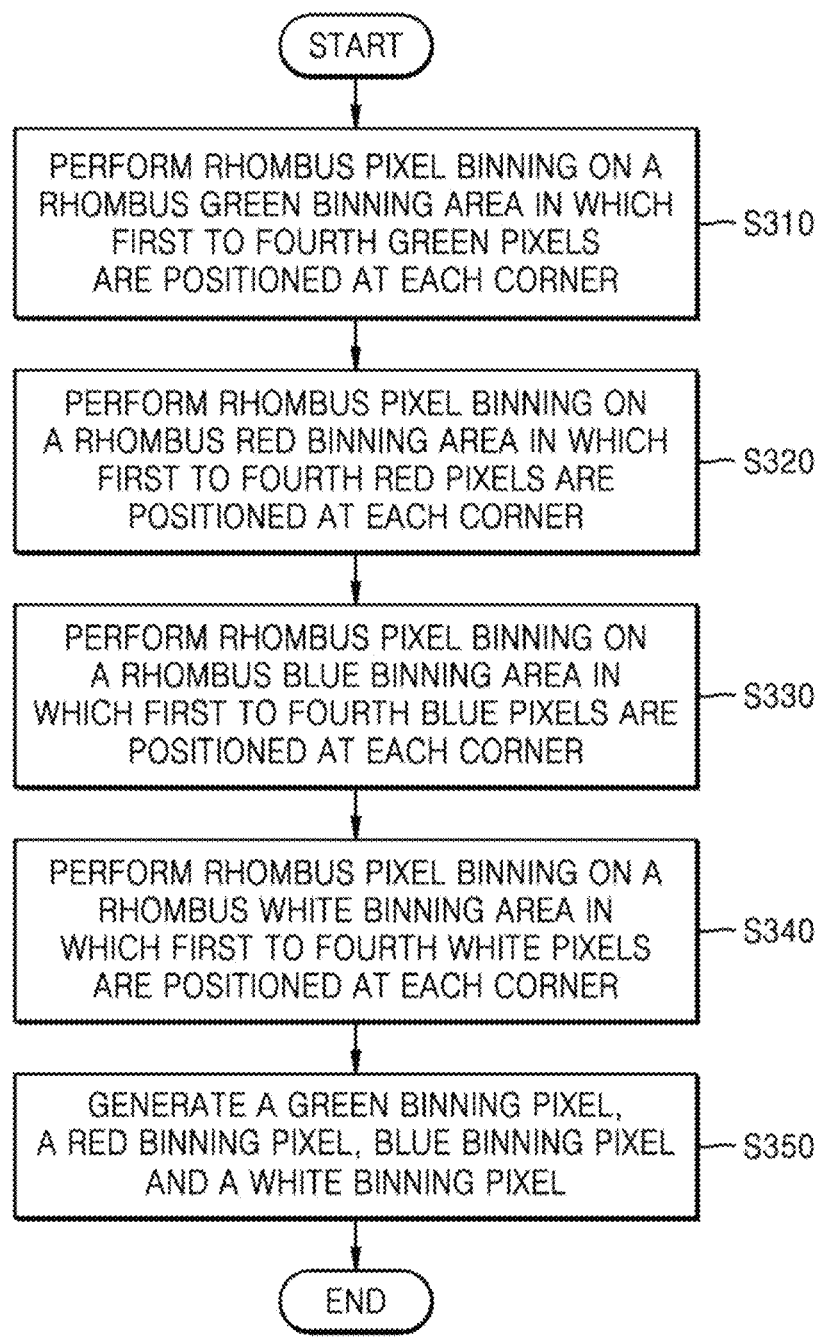
FIG. 4 is a flowchart of a method of performing pixel binning on a green pixel, a red pixel, a blue pixel and a white pixel arranged in a rhombus binning area according to an example embodiment of the disclosure.

FIG. 4 is a flowchart of a method of performing pixel binning on a green pixel, a red pixel, a blue pixel and a white pixel arranged in a rhombus binning area according to an example embodiment of the disclosure.

Referring to FIG. 4, in operation S310, rhombus pixel binning may be performed on a rhombus area of the pixel array 110 (hereinafter, referred to as a green rhombus binning area) in which a first green pixel, a second green pixel, a third green pixel, and a fourth green pixel are positioned at each corner according to an example embodiment.

The first green pixel and the second green pixel may be selected from the pixel array 110 in such a configuration that the first and second green pixels may be arranged in the first diagonal direction. In an example embodiment, one pixel may be arranged between the first and second green pixels in the first diagonal line. In addition, the third green pixel may be selected from the pixel array 110 in such a configuration that the first green pixel and the third green pixel may be arranged in the second diagonal direction. One pixel may be arranged between the first green pixel and the third green pixel in the second diagonal direction. The fourth green pixel may be selected from the pixel array 110 in such a configuration that the second green pixel and the fourth green pixel may be arranged in the second diagonal direction and the third green pixel and the fourth green pixel may be arranged in the first diagonal direction. A gap distance between the first green pixel and the second green pixel in the first diagonal direction may be the same as the gap distance between the first green pixel and the third green pixel in the second diagonal direction. Furthermore, a gap distance between the second green pixel and the fourth green pixel in the second diagonal direction may be the same as the gap distance between the third green pixel and the fourth green pixel in the first diagonal direction. The first green pixel and the fourth green pixel may be arranged in the same pixel column and the second green pixel and the third green pixel may be arranged in the same pixel row. In an example embodiment, the first to fourth green pixels may generate the rhombus binning area of which a side length may be about $2\sqrt{2}$ times the distance between one of the first to fourth pixels and a neighboring pixel thereof. In an example embodiment, the first diagonal direction may be the same as the slash direction. The slash direction may be directed at an angle of about 45° counterclockwise from the row line RL of the pixel array 110. In addition, the second diagonal direction may be the back slash direction. The back slash direction may be directed at an angle of about 135° counterclockwise from the row line RL of the pixel array 110.

In operation S230, rhombus pixel binning may be performed on a rhombus area of the pixel array 110 (hereinafter, referred to as a red rhombus binning area) in which a first red pixel, a second red pixel, a third red pixel, and a fourth red pixel may be positioned at each corner.

In operation S330, rhombus pixel binning may be performed on a rhombus area of the pixel array 110 (hereinafter, referred to as a blue rhombus binning area) in which a first blue pixel, a second blue pixel, a third blue pixel, and a fourth blue pixel may be positioned at each corner.

In operation S340, rhombus pixel binning may be performed on a rhombus area of the pixel array 110 (hereinafter, referred to as a white rhombus binning area) in which a first white pixel, a second white pixel, a third white pixel, and a fourth white pixel may be positioned at each corner.

The red, blue, and white rhombus binning areas may have the same shape and size as the green rhombus binning area.

In operation S350, a green binning pixel, a red binning pixel, a blue binning pixel, and a white binning pixel may be generated. Operation S350 may be performed after the rhombus pixel binning is performed on the green, red, blue, and white rhombus binning areas.

Thus, as the number of the binning pixels may be less than that of actual pixels of the pixel array 110, the amount of data for the output image data OIDT may be sufficiently reduced by the pixel binning. In addition, the false color and the zigzag-shaped noise caused by the sampling frequency difference may also be alleviated by the pixel binning. The rhombus binning area is described in detail with reference to FIGS. 7A and 7B hereinafter.

Figure 5A:
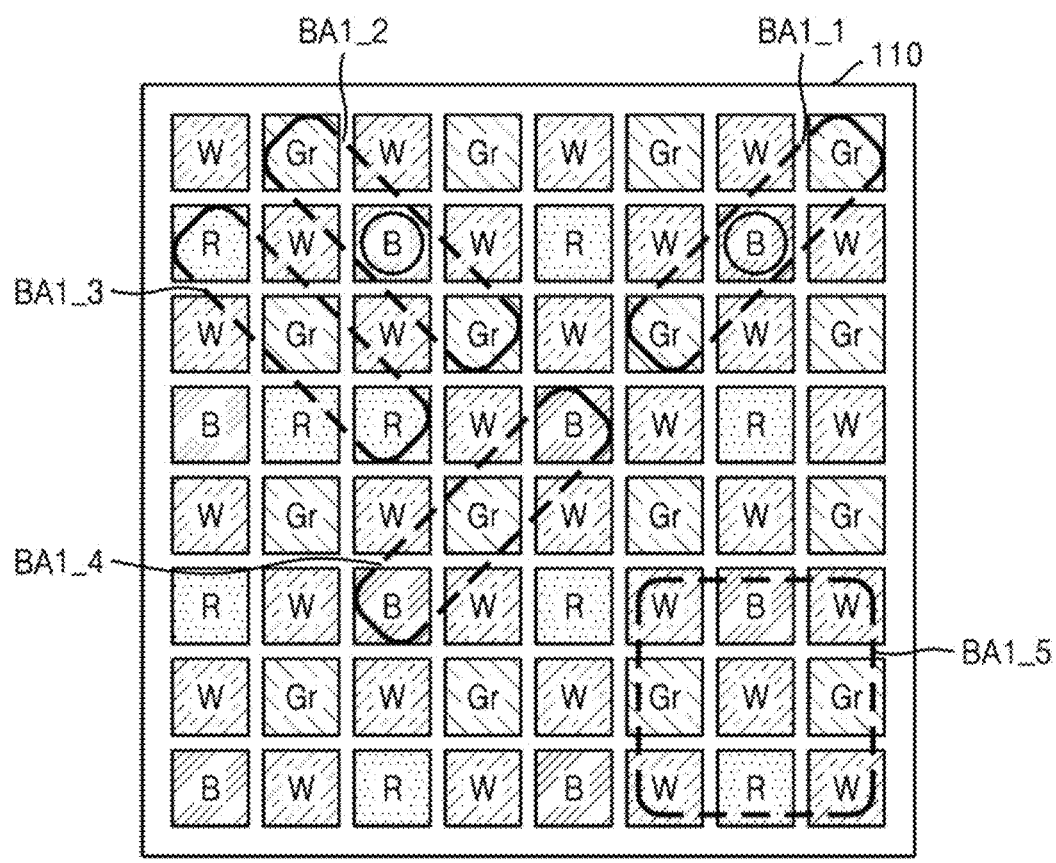
FIG. 5A is a diagram illustrating a diagonal binning area including green pixels selected from the pixels of the pixel array according to an example embodiment of the disclosure.
Figure 5B:
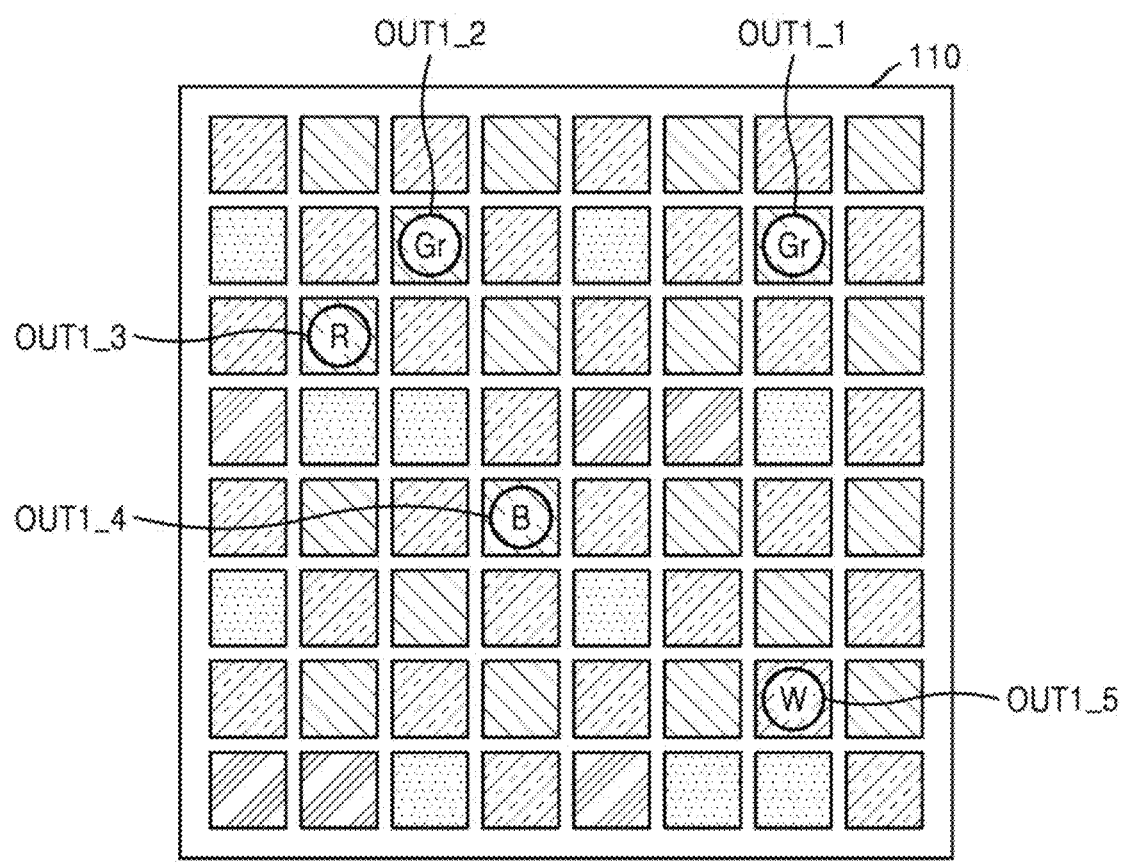
FIG. 5B is a diagram illustrating a green binning pixel generated by the pixel binning on the diagonal binning area shown in FIG. 5A according to an example embodiment of the disclosure.

FIG. 5A is a diagram illustrating a diagonal binning area including green pixels selected from the pixels of the pixel array according to an example embodiment of the disclosure. FIG. 5B is a diagram illustrating a green binning pixel generated by the pixel binning on the diagonal binning area shown in FIG. 5A according to an example embodiment of the disclosure. FIGS. 5A and 5B are views illustrating a method of generating the green binning pixels in FIG. 2.

Referring to FIG. 5A, the pixel array 110 according to an example embodiment of the disclosure may include a plurality of pixels in which a plurality of red pixels, green pixels, blue pixels, and white pixels may be arranged into an RGBWC pattern.

A first green pixel and a second green pixel may be selected from the pixel array 110 in such a configuration that the first green pixel and the second green pixel may be arranged on an axis parallel to a first diagonal direction, to thereby form a first green binning area BA1_1 in the first diagonal direction. The first diagonal direction may be defined as a slash direction. As described above, the slash direction may be directed at an angle of about 45° counterclockwise from the row line RL of the pixel array 110. In an example embodiment, a pair of the green pixels Gr may be arranged in the first green binning area BA1_1 in the first diagonal direction. However, the number of green pixels in the first green binning area BA1_1 is not limited as such.

A third green pixel and a fourth green pixel may be selected from the pixel array 110 in such a configuration that the third and fourth green pixels may be arranged on an axis parallel to a second diagonal direction, to thereby form a second green binning area BA1_2 in the second diagonal direction. The second diagonal direction may be defined as a back slash direction. As described above, the back slash direction may be directed at an angle of about 135° counterclockwise from the row line RL of the pixel array 110. In an example embodiment, a pair of the green pixels Gr may be arranged in the second green binning area BA1_2 in the second diagonal direction. However, the number of green pixels in the second green binning area BA1_2 is not limited as such.

Referring to FIG. 5B, the diagonal pixel binning may be performed on the first green binning area BA1_1 and the second green binning area BA1_2, to thereby generate a first green binning pixel OUT1_1 and a second green binning pixel OUT1_2. In an example embodiment, the first green binning pixel OUT1_1 may be generated by the diagonal pixel binning on the first and second green pixels in the first green binning area BA1_1 and the second green binning pixel OUT1_2 may be generated by the diagonal pixel binning on the third and fourth green pixels in the second green binning area BA1_2. The first green binning pixel OUT1_1 may be positioned at a midpoint of the first and second green pixels in the first diagonal direction, and the second green binning pixel OUT1_2 may be positioned at a midpoint of the third and fourth green pixels in the second diagonal direction.

The image data may be generated from the first and second green binning pixels, instead of from all the pixels in the first and second green binning areas BA1_1 and BA1_2. The first, second, third, and fourth green pixels may be arbitrary pixels that may be arbitrarily selected from the green pixels Gr of the pixel array 110. Thus, the first, second, third, and fourth green pixels are not particular green pixels Gr of the pixel array 110.

The diagonal pixel binning may also be performed on a plurality of red pixels R of the pixel array 110 in the same way as the diagonal pixel binning on a plurality of green pixels Gr. In an example embodiment, a first red pixel and a second red pixel that may be arranged on an axis parallel to the second diagonal direction may be selected from a red binning area BA1_3 of the pixel array 110. When the first red pixel and the second red pixel are selected from the pixel array 110, the area connecting the first red pixel and the second red pixel in the second diagonal direction may be formed into the red binning area BA1_3. Thereafter, the diagonal pixel binning may be performed on the first and second red pixels R in the red binning area BA1_3, to thereby generate a red binning pixel OUT1_3. In an example embodiment, the red binning pixel OUT1_3 may be positioned at a midpoint of the first red pixel and the second red pixel in the second diagonal direction.

The image data may be generated from the red binning pixel OUT1_3, instead of from all the pixels in the red binning area BA1_3. The diagonal pixel binning may also be performed on the red pixels in the first diagonal direction.

The diagonal pixel binning may also be performed on a plurality of blue pixels B of the pixel array 110 in the same way as the diagonal pixel binning on a plurality of green pixels Gr. In an example embodiment, a first blue pixel and a second blue pixel that may be arranged on an axis parallel to the first diagonal direction may be selected from a blue binning area BA1_4 of the pixel array 110. When the first blue pixel and the second blue pixel are selected, the area connecting the first blue pixel and the second blue pixel in the first diagonal direction may be formed into the blue binning area BA1_4. Once the blue binning area BA1_4 is generated, a blue binning pixel OUT1_4 may be generated corresponding to a diagonal binning operation performed on the first and second blue pixels B. The blue binning pixel OUT1_4 may be positioned at a midpoint of the first and second blue pixels B in the first diagonal direction. The image data may be generated from the blue binning pixel OUT1_4, not from all the pixels in the blue binning area BA1_4. The diagonal pixel binning may also be performed on the blue pixels in the second diagonal direction. In addition, the blue binning area BA1_4 may have the same shape and direction as the first green binning area BA1_1.

When the diagonal pixel binning is performed on the green pixels Gr, the square pixel binning may be performed on a plurality of white pixels W of the pixel array 110. In an example embodiment, a first white pixel, a second white pixel, a third white pixel, and a fourth white pixel W may be selected from the pixel array 110, to thereby form a white binning area BA1_5. Particularly, the first to fourth white pixels W may be positioned at four corners of a square, thus the white binning area BA1_5 may be formed into a square shape. The white binning area BA1_5 may be provided as a matrix of 3 pixels by 3 pixels, which should not be construed as limited to the number of pixels in the white binning area BA1_5. Thereafter, the square pixel binning may be performed on the first to fourth white pixels W in the square-shaped white binning area BA1_5, to thereby generate a first white binning pixel OUT1_5. The first white binning pixel OUT1_5 may be positioned at a geometric center of the first to fourth white pixels W in the square-shaped white binning area BA1_5.

According to an example embodiment, the rhombus pixel binning may be performed on a plurality of white pixels W in the rhombus white binning area. In an example embodiment, first to fourth white pixels may be selected from the pixel array 110 in such a configuration that the first to fourth white pixels may be positioned at four corners of the rhombus white binning area. Once the first to fourth white pixels are selected, the rhombus pixel binning may be performed on the first to fourth white pixels in the rhombus white binning area, to thereby generate a second white binning pixel. The second white binning pixel may be positioned at a geometric center of the first to fourth white pixels W in the rhombus white binning area.

According to an example embodiment of the disclosure, the noise and resolution of the output image data may be controlled by adjusting the readout ratio of the white binning pixels. The operation of the read out of the white binning pixel is described in detail with reference to FIG. 9 hereinafter.

A plurality of binning areas and a plurality of binning pixels may be generated at other areas of the pixel array 110, as would be known to one of ordinary skill in the art.

Figure 6A:
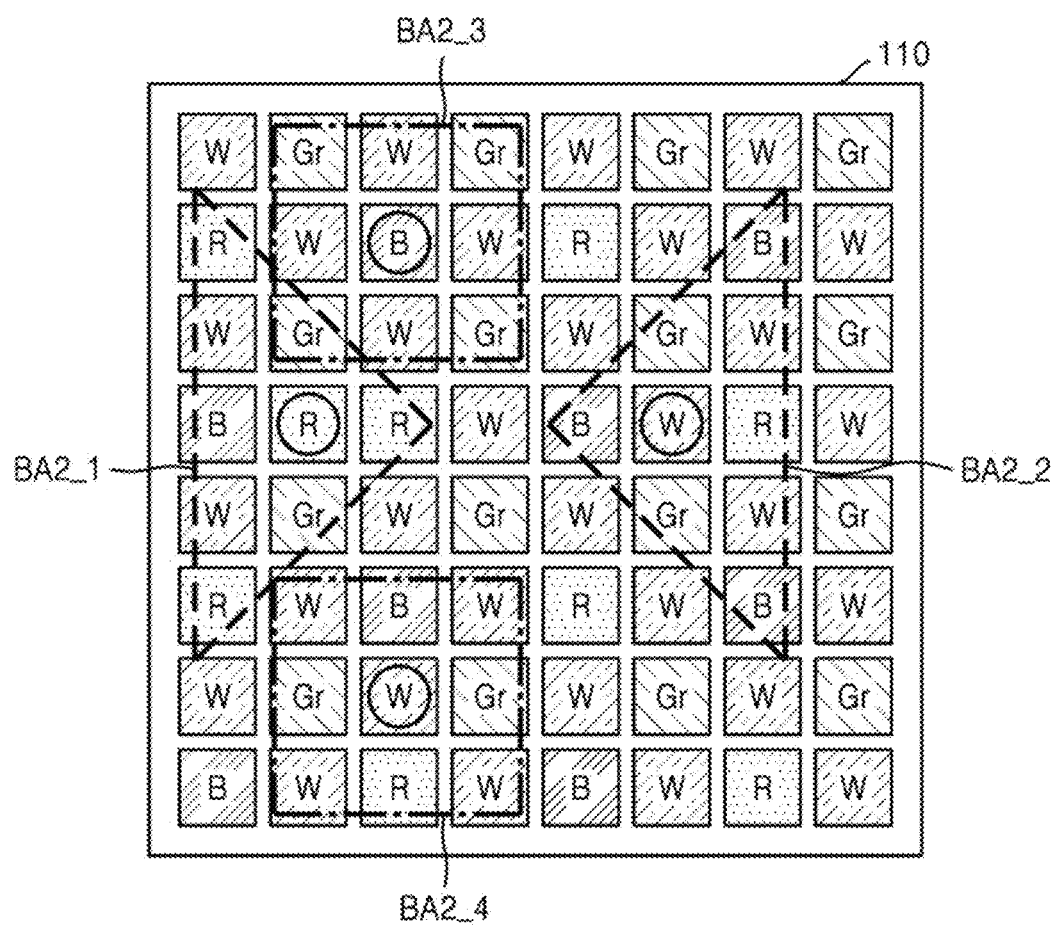
FIG. 6A is a diagram illustrating a plurality of binning areas of the pixel array regarding green pixels, red pixels, blue pixels, and white pixels according to an example embodiment of the disclosure.
Figure 6B:
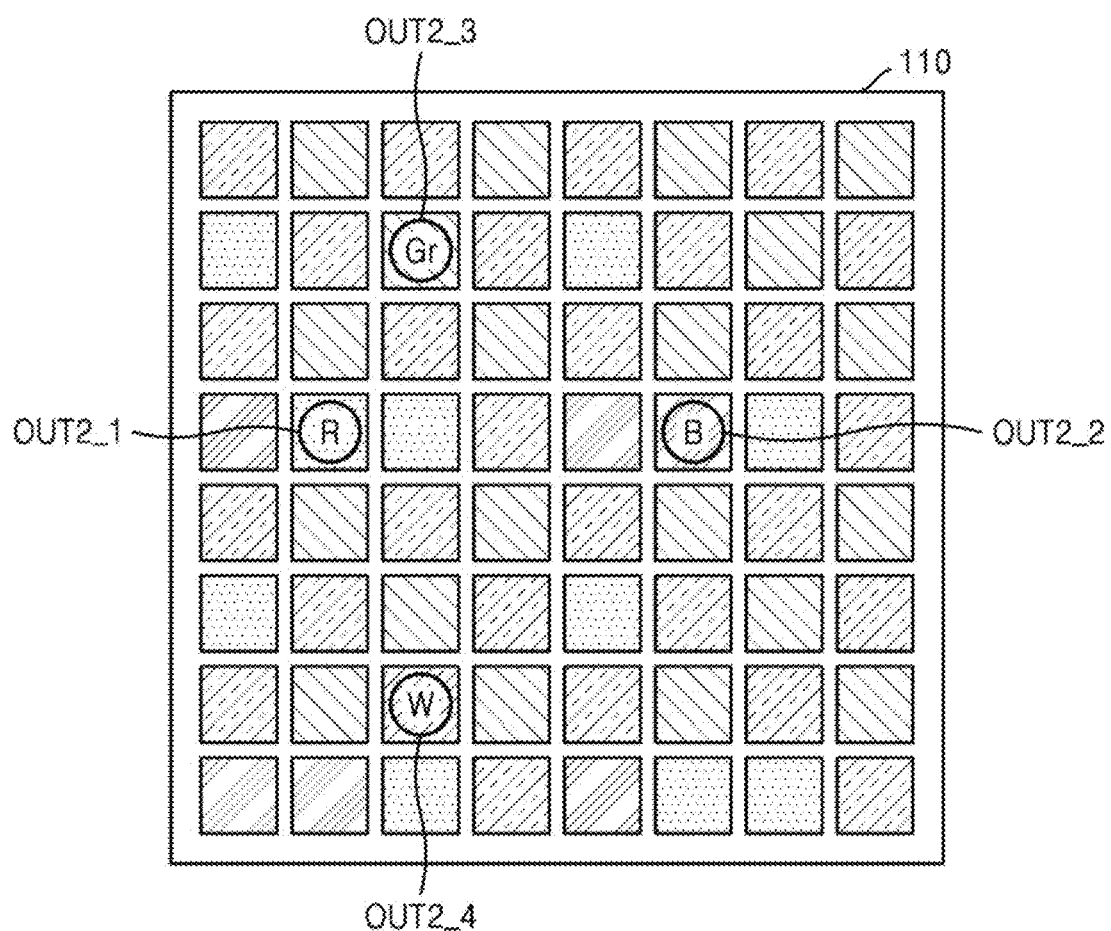
FIG. 6B is a diagram illustrating a red binning pixel, a blue binning pixel, a green binning pixel, and a white binning pixel by the pixel binning on the binning areas shown in FIG. 6A according to an example embodiment of the disclosure.

FIG. 6A is a diagram illustrating a plurality of binning areas of the pixel array regarding green pixels, red pixels, blue pixels, and white pixels according to an example embodiment of the disclosure. FIG. 6B is a diagram illustrating a red binning pixel, a blue binning pixel, a green binning pixel, and a white binning pixel by the pixel binning on the binning areas shown in FIG. 6A according to an example embodiment of the disclosure.

In particular, FIG. 6A is a plan view illustrating a plurality of binning areas BA2_1, BA2_2, BA2_3, and BA2_4 of the pixel array 110 regarding green pixels Gr, red pixels R, blue pixels B, and white pixels W. Further, FIG. 6B is a plan view illustrating a red binning pixel OUT2_1, a blue binning pixel OUT2_2, a green binning pixel OUT2_3 and a white binning pixel OUT2_4 by the pixel binning on the binning areas shown in FIG. 6A. FIGS. 6A and 6B are plan views illustrating a method of generating the red binning pixels and blue binning pixels in FIG. 3 in accordance with an example embodiment of the disclosure.

Referring to FIG. 6A, a first red pixel and a second red pixel may be selected from a first pixel column of the pixel array 110 having a plurality of pixel columns as a part of the corner pixels of the red binning area BA2_1 regarding the red pixels R. In an example embodiment, three pixels may be arranged between the first and second red pixels in the column direction. In addition, a third red pixel may be selected from a third pixel row that may be positioned at a midpoint of a first pixel row and a second pixel row, such that the red binning area may be shaped into an isosceles triangle at each corner of which the first to third red pixels may be arranged. The first red pixel may be arranged in the first pixel row, and the second red pixel may be arranged in the second pixel row. In addition, the third red pixel may be arranged in the second pixel column. In an example embodiment, one pixel may be positioned between the third red pixel (e.g., in the second pixel column) and the first pixel column. That is, the red binning area BA2_1 may be generated as an isosceles triangular shape in which the first to three red pixels R may be positioned at each corner.

In addition, a first blue pixel and a second blue pixel may be selected from a third pixel column of the pixel array 110 having a plurality of pixel columns as a part of the corner pixels of the blue binning area BA2_2 regarding the blue pixels B. In an example embodiment, three pixels may be arranged between the first and second blue pixels. In addition, a third blue pixel may be selected from a sixth pixel row that may be positioned at a midpoint of a fourth pixel row in which the first blue pixel may be arranged and a fifth pixel row in which the second blue pixel may be arranged. In addition, the third blue pixel may be arranged in the fourth pixel column. In an example embodiment, one pixel may be positioned between the third blue pixel (in the fourth pixel column) and the third pixel column. Thus, the blue binning area BA2_2 may be generated into the isosceles triangular shape in which the first to three blue pixels B may be positioned at each corner.

In an example embodiment of the disclosure, the first pixel row may be the same as the fourth pixel row and the second pixel row may be the same as the fifth pixel row. In addition, the third pixel row may be the same as the sixth pixel row. However, the above embodiments are not limited as such.

In addition, 4 green pixels may be selected from the pixel array 110, to thereby generate a square-shaped green binning area BA2_3 regarding the green pixels Gr. In an example embodiment, the first to fourth green pixels may be selected from a plurality of green pixels Gr of the pixel array 110 in such a configuration that the first to fourth green pixels may be positioned at each corner of the square-shaped green binning area BA2_3. The square green binning area BA2_3 may be provided as a matrix of 3 pixels by 3 pixels, which should not be construed as limited to the matrix size of the square green binning area BA2_3.

In addition, 4 white pixels may be selected from the pixel array 110, to thereby generate a square-shaped white binning area BA2_4 regarding the white pixels W. In an example embodiment, the first to fourth white pixels may be selected from a plurality of white pixels W of the pixel array 110 in such a configuration that the first to fourth white pixels may be positioned at each corner of the square-shaped white binning area BA2_4. The square white binning area BA2_4 may be provided as a matrix of 3 pixels by 3 pixels, which should not be construed as limited to the matrix size of the square white binning area BA2_4.

Referring to FIG. 6B, a red binning pixel OUT2_1, a blue binning pixel OUT2_2, a green binning pixel OUT2_3 and a white binning pixel OUT2_4 may be generated by the pixel binning according to an example embodiment. The red binning pixel OUT2_1 may be positioned at a central point of a line connecting a height point and a central point of a base line of the isosceles red binning area BA2_1, and the blue binning pixel OUT2_2 may be positioned at a central point of a line connecting a height point and a central point of a base line of the isosceles blue binning area BA2_2. The green binning pixel OUT2_3 may be positioned at a geometric center of the square green binning area BA2_3, and the white binning pixel OUT2_4 may be positioned at a geometric center of the square white binning area BA2_4.

Once the red binning pixel OUT2_1, the blue binning pixel OUT2_2, the green binning pixel OUT2_3, and the white binning pixel OUT2_4 are generated, the image data may be generated from the red binning pixel OUT2_1, the blue binning pixel OUT2_2, the green binning pixel OUT2_3, and the white binning pixel OUT2_4, instead of from all the pixels in the red binning area BA2_1, the blue binning area BA2_2, the green binning area BA2_3, and the white binning area BA2_4.

A plurality of binning areas and a plurality of binning pixels may be generated at other areas of the pixel array 110, as will be understood by one of ordinary skill in the art from the disclosure herein.

Figure 7A:
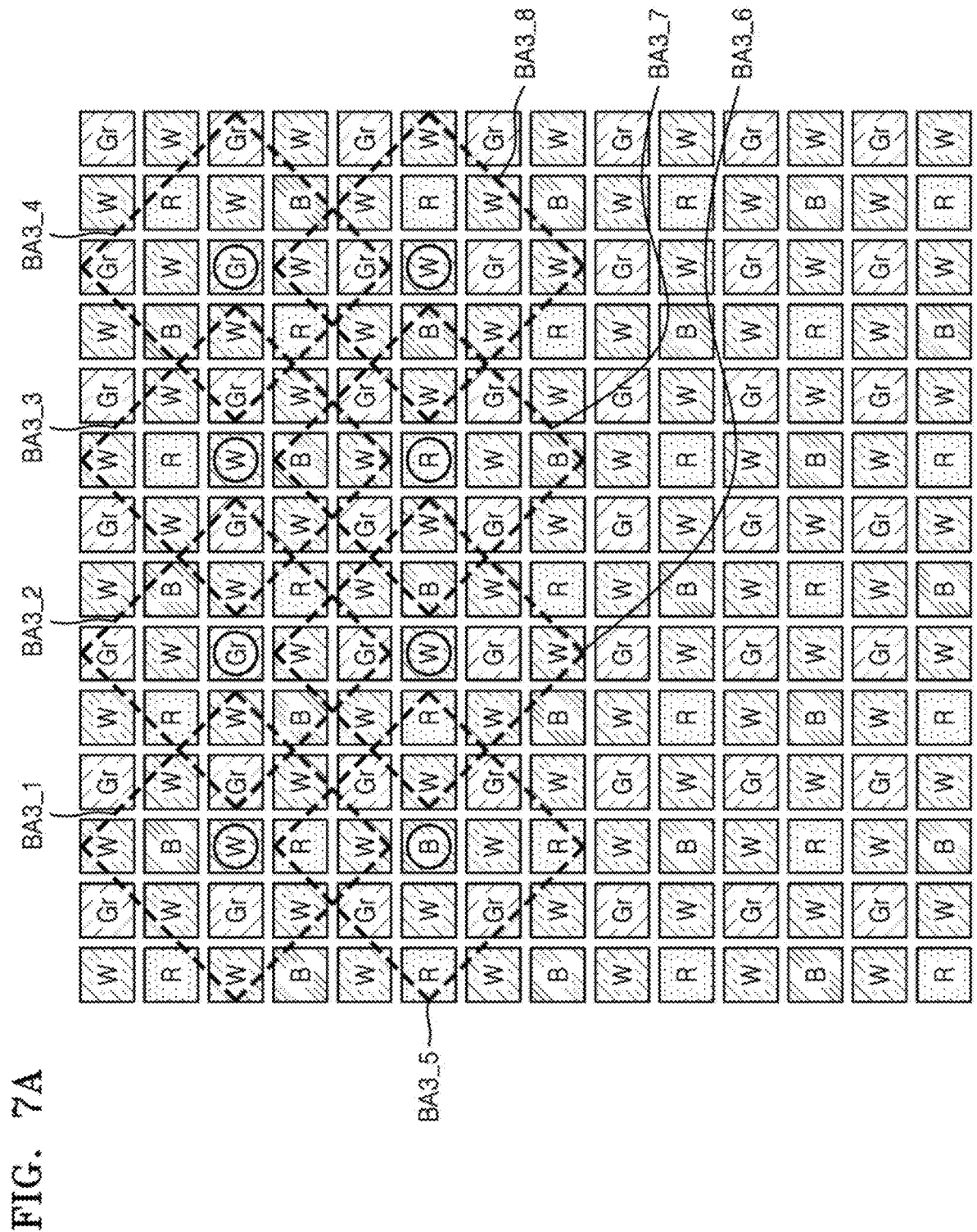
FIG. 7A is a diagram illustrating a plurality of rhombus binning areas regarding the green pixels, red pixels, blue pixels, and white pixels of the pixel array according to an example embodiment of the disclosure.
Figure 7B:
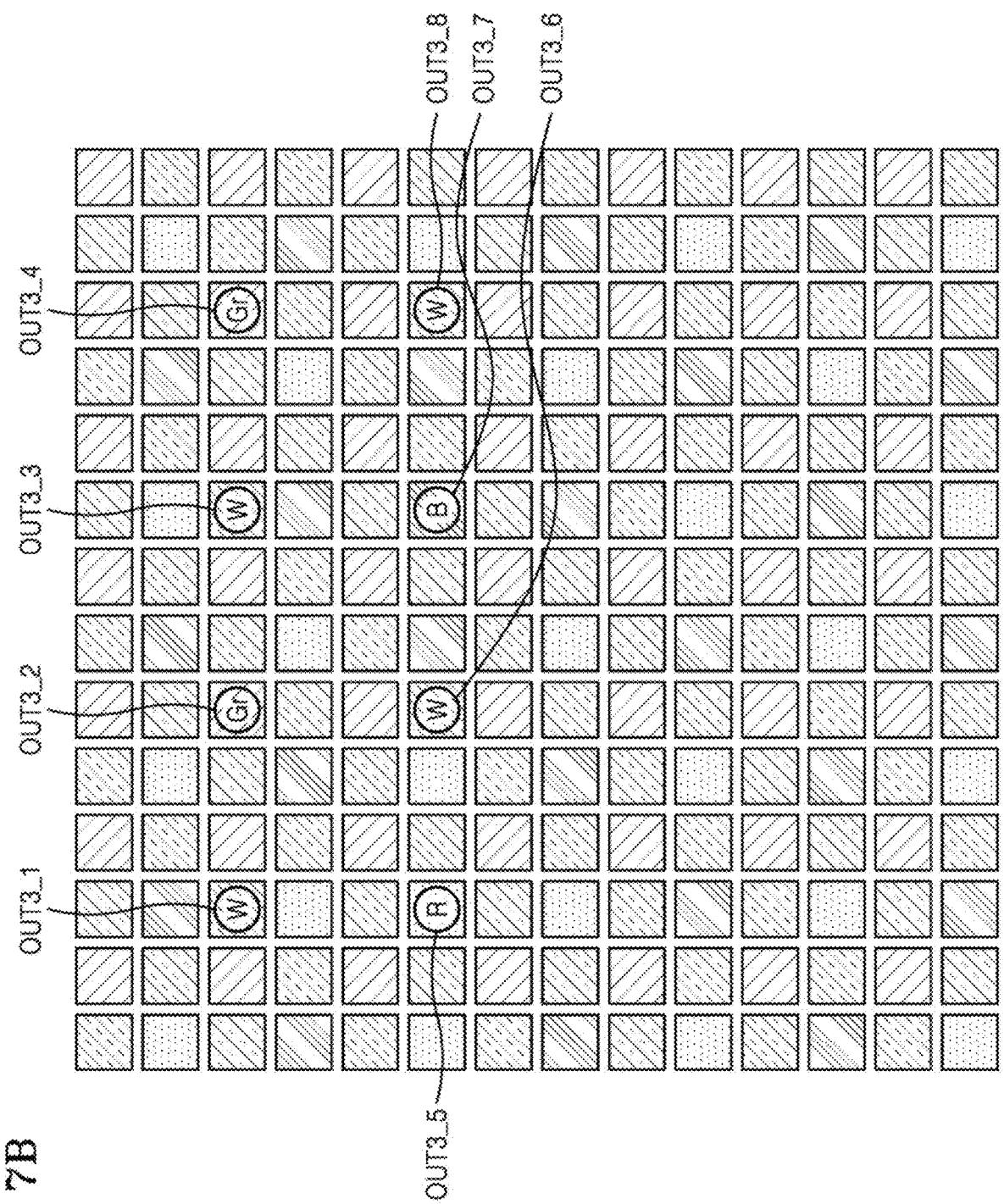
FIG. 7B is a diagram illustrating green binning pixels, a red binning pixel, a blue binning pixel, and white binning pixels by the pixel binning on the rhombus binning areas shown in FIG. 7A according to an example embodiment of the disclosure.

FIG. 7A is a diagram illustrating a plurality of rhombus binning areas regarding the green pixels, red pixels, blue pixels, and white pixels of the pixel array according to an example embodiment of the disclosure. FIG. 7B is a diagram illustrating green binning pixels, a red binning pixel, a blue binning pixel, and white binning pixels by the pixel binning on the rhombus binning areas shown in FIG. 7A according to an example embodiment of the disclosure.

In particular, FIG. 7A is a plan view illustrating a plurality of rhombus binning areas BA3_1, BA3_2, BA3_3, BA3_4, BA3_5, BA3_6, BA3_7, and BA3_8 regarding the green pixels Gr, red pixels R, blue pixels B, and white pixels W of the pixel array 110 according to an example embodiment of the disclosure. Further, FIG. 7B is a plan view illustrating green binning pixels OUT3_2 and OUT3_4, a red binning pixel OUT3_5, a blue binning pixel OUT3_7, and white binning pixels OUT3_1, OUT3_3, OUT3_6 and OUT3_8 by the pixel binning on the rhombus binning areas shown in FIG. 7A.

In an example embodiment of the disclosure, a first green pixel, a second green pixel, a third green pixel and a fourth green pixel may be selected from the pixel array 110 in such a configuration that the first to fourth green pixels may be arranged at corners of a rhombus, respectively. The green binning pixels OUT3_2 and OUT3_4 may be generated by the pixel binning on the rhombus green binning areas BA3_2 and BA3_4. The rhombus may include a pair of first sides extending in the first diagonal direction and a pair of second sides extending in the second diagonal direction. The first green pixel and the second green pixel may be arranged in the first diagonal direction, and one pixel may be positioned between the first and second green pixels in the first diagonal direction. In an example embodiment of the disclosure, the rhombus green binning areas BA3_2 and BA3_4 may have the same sides of which the length may correspond to a distance between the first green pixel and the second green pixel. The first green pixel and the third green pixel may be arranged in the first pixel column, and three pixels may be arranged between the first green pixel and the third green pixel. The second green pixel and the fourth green pixel may be arranged in the first pixel row, and three pixels may be arranged between the second green pixel and the fourth green pixel. Thus, the green binning areas BA3_2 and BA3_4 may be generated as the rhombus shape in which the first to fourth green pixels may be positioned at each corner. Once the rhombus green binning areas BA3_2 and BA3_4 are generated with regard to the first to fourth green pixels, a pixel binning may be performed on green pixels Gr in the rhombus green binning areas BA3_2 and BA3_4.

When the rhombus pixel binning is performed on the green pixels Gr, a rhombus red binning area including red pixels R, a rhombus white binning area including white pixels W, and a rhombus blue binning area including blue pixels B may also be generated in the same shape as the rhombus green binning area.

In an example embodiment, the white binning areas BA3_1, BA3_3, BA3_6, and BA3_8 may be shaped into a rhombus that may be generated based on first to fourth white pixels. In an example embodiment, the first to fourth white pixels may generate a rhombus area of which a side length may be about $2\sqrt{2}$ times the distance between one of the first to fourth white pixels and a neighboring pixel thereof.

In addition, the red binning areas BA3_5 may be shaped into a rhombus that may be generated based on first to fourth red pixels. In an example embodiment, the first to fourth red pixels may generate a rhombus area of which a side length may be about $2\sqrt{2}$ times the distance between one of the first to fourth red pixels and a neighboring pixel thereof.

In addition, the blue binning areas BA3_7 may be shaped into a rhombus that may be generated based on first to fourth blue pixels. In an example embodiment, the first to fourth blue pixels may generate a rhombus area of which a side length may be about $2\sqrt{2}$ times the distance between one of the first to fourth blue pixels and a neighboring pixel thereof.

Referring to FIG. 7B, when the rhombus green binning areas BA3_2 and BA3_4 are generated to include four green pixels, a pixel binning may be performed on the rhombus green binning areas BA3_2 and BA3_4, to thereby generate green binning pixels OUT3_2 and OUT3_4. Thus, the image data may be generated from the green binning pixels OUT3_2 and OUT3_4, not from all the pixels in the green binning areas BA3_2 and BA3_4. The green binning pixels OUT3_2 and OUT3_4 may be positioned at a geometric center of the rhombus green binning areas BA3_2 and BA3_4, respectively.

In addition, when the rhombus white binning areas BA3_1, BA3_3, BA3_6, and BA3_8 are generated to include 4 white pixels, a pixel binning may be performed on the rhombus white binning areas BA3_1, BA3_3, BA3_6, and BA3_8, to thereby generate white binning pixels OUT3_1, OUT3_3, OUT3_6, and OUT3_8. Thus, the image data may be generated from the white binning pixels OUT3_1, OUT3_3, OUT3_6, and OUT3_8, instead of from all the pixels in the white binning areas BA3_1, BA3_3, BA3_6, and BA3_8. The white binning pixels OUT3_1, OUT3_3, OUT3_6, and OUT3_8 may be positioned at a geometric center of the rhombus white binning areas BA3_1, BA3_3, BA3_6, and BA3_8, respectively.

In addition, when the rhombus red binning area BA3_5 is generated to include the first red pixel, the second red pixel, the third red pixel, and the fourth red pixel, a pixel binning may be performed on the rhombus red binning area BA3_5, to thereby generate a red binning pixel OUT3_5. Thus, the image data may be generated from the red binning pixel OUT3_5, instead of from all the pixels in the red binning area BA3_5. The red binning pixel OUT3_5 may be positioned at a geometric center of the rhombus red binning area BA3_5.

In addition, when the rhombus blue binning area BA3_7 is generated to include the first blue pixel, the second blue pixel, the third blue pixel, and the fourth blue pixel, a pixel binning may be performed on the rhombus blue binning area BA3_7, to thereby generate a blue binning pixel OUT3_7. Thus, the image data may be generated from the blue binning pixel OUT3_7, instead of from all the pixels in the blue binning area BA3_7. The blue binning pixel OUT3_7 may be positioned at a geometric center of the rhombus blue binning area BA3_7.

That is, the pixel binning may be performed on the rhombus red binning area, the rhombus white binning area, and the rhombus blue binning area corresponding to the red pixels R, the white pixels W, and the blue pixels B, respectively, to thereby generate the red binning pixel OUT3_5, the blue binning pixel OUT3_7, and a plurality of white binning pixels OUT3_1, OUT3_3, OUT3_6, and OUT3_8.

A plurality of binning areas and a plurality of binning pixels may be generated at other areas of the pixel array 110, as will be understood by one of ordinary skill in the art from the disclosure herein.

FIG. 8 is a flowchart of a method of selecting mismatch points from the image data according to an example embodiment of the disclosure.

Referring to FIG. 8, in operation S410, the image processor 160 may control the readout unit 130 to read out the pixel signals from the pixels PX of the pixel array 110.

In operation S420, the image processor 160 may compare the color of first image data with the color of second image data pixel-by-pixel. Operation S420 may be performed after the plurality of pixel signals is read out from the pixel array 110. The first image data may be generated by processing the pixel signals from the actual pixels PX of the pixel array 110 before the pixel binning may be performed. The second image data may be generated by processing the pixel signals from the binning pixels that may be generated by the pixel binning on the binning area including at least one of the green pixels Gr, the red pixels R, the blue pixels B and the white pixels W.

In operation S430, the image processor 160 may select the mismatch points of the binning pixels in the second diagonal direction. Operation S430 may be performed after the color of the first image data and the color of the second image data are compared with each other pixel-by-pixel. The second diagonal direction may be the same as the back slash direction. The mismatch point may be defined as the pixel position at which the color of the first image data may be different from that of the second image data.

In operation S440, the image processor 160 may generate the output image data OIDT by processing the pixel signals from the binning pixels except for the mismatch points. Operation S440 may be performed after the mismatch points are selected from all the binning pixels. According to the method disclosed herein, the amount of the output image data OIDT may be sufficiently reduced by comparing the images (colors) of the first and second image data and selecting the mismatch points of the binning pixels in the second diagonal direction. In addition, the false color and the zigzag-shaped noise caused by variations of the sampling frequency may also be alleviated by the pixel binning.

Figure 9:
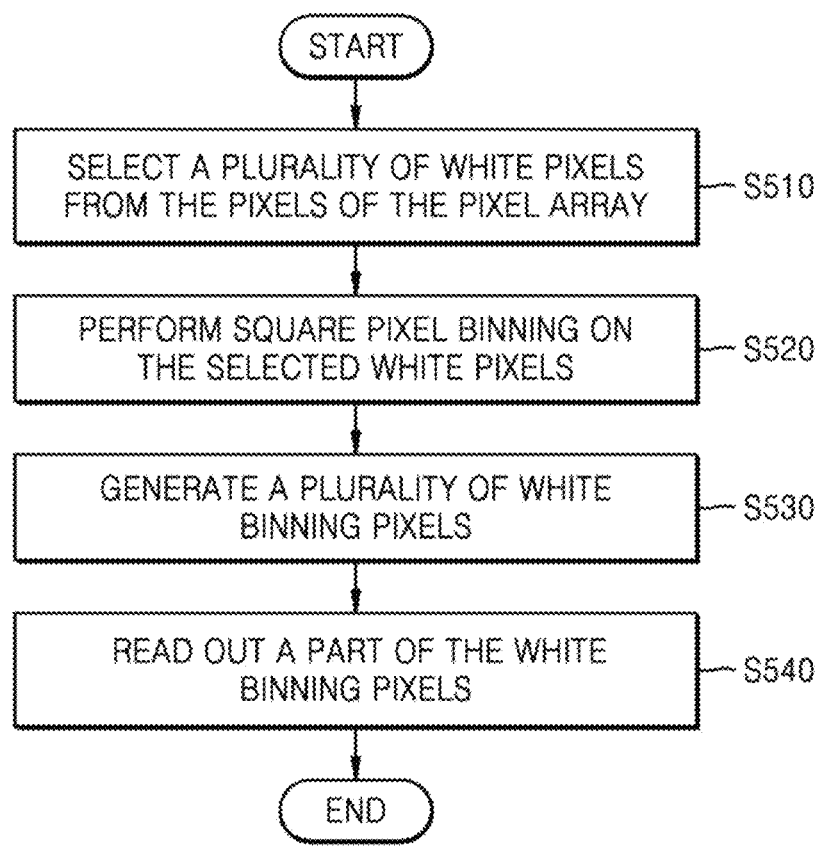
FIG. 9 is a flowchart of a process for reading out a plurality of white binning pixels according to an example embodiment of the disclosure.

FIG. 9 is a flowchart of a process for reading out a plurality of white binning pixels according to an example embodiment of the disclosure.

Referring to FIG. 9, in operation S510, the image processor 160 may select a plurality of white pixels W from the pixels PX of the pixel array 110 for the pixel binning on the white pixels W.

In operation S520, the image processor 160 may perform the square pixel binning, as described in detail with reference to FIG. 6A, on the selected white pixels W. Operation S520 may be performed based on completing the selection of the white pixels W.

In operation S530, a plurality of white binning pixels may be generated by repeating the square pixel binning on the white pixels W.

In operation S540, the image processor 160 may select a part of the white binning pixels and may generate the output image data OIDT by processing the pixel signals from the selected white binning pixels. Operation S540 may be performed based on the plurality of white binning pixels being generated. As a part of the white binning pixels may be selected for the output image data OIDT, the noise of the output image data OIDT may be sufficiently controlled in the image sensor 100. In an example embodiment of the disclosure, a half of the white binning pixels may be selected for the output image data OIDT. Furthermore, the color of the output image may be corrected by adjusting a readout ratio of the white binning pixels, and the false color and the zigzag-shaped noise may be alleviated in the output image. The readout ratio of the white binning pixels for the output image data OIDT should not be limited to about ½, and may be controlled to a proper degree.

Figure 10:
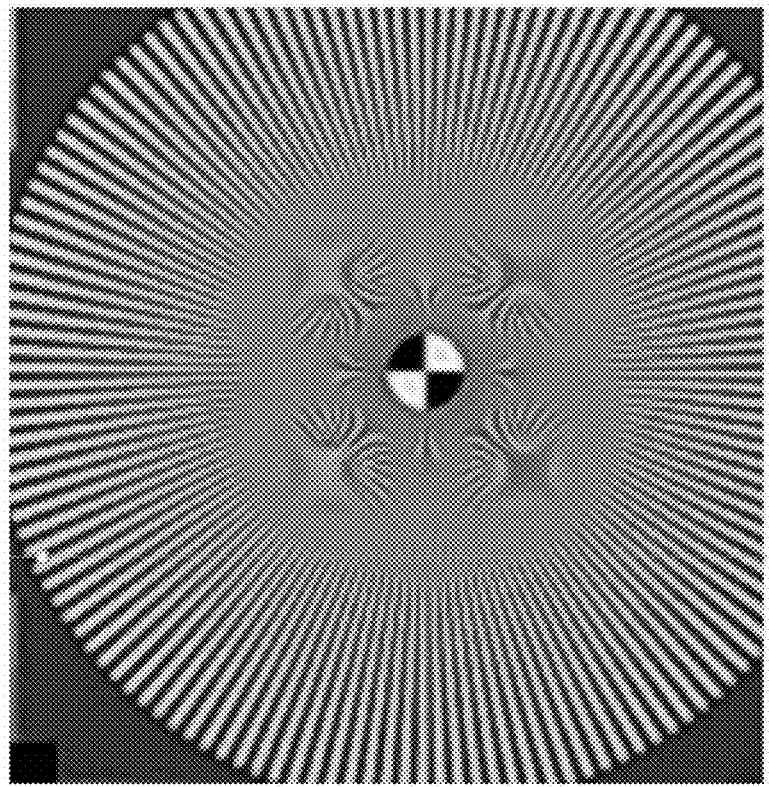
FIG. 10 is a diagram illustrating an output image after performing a rhombus pixel binning on the green pixels according to an example embodiment of the disclosure.
Figure 11:
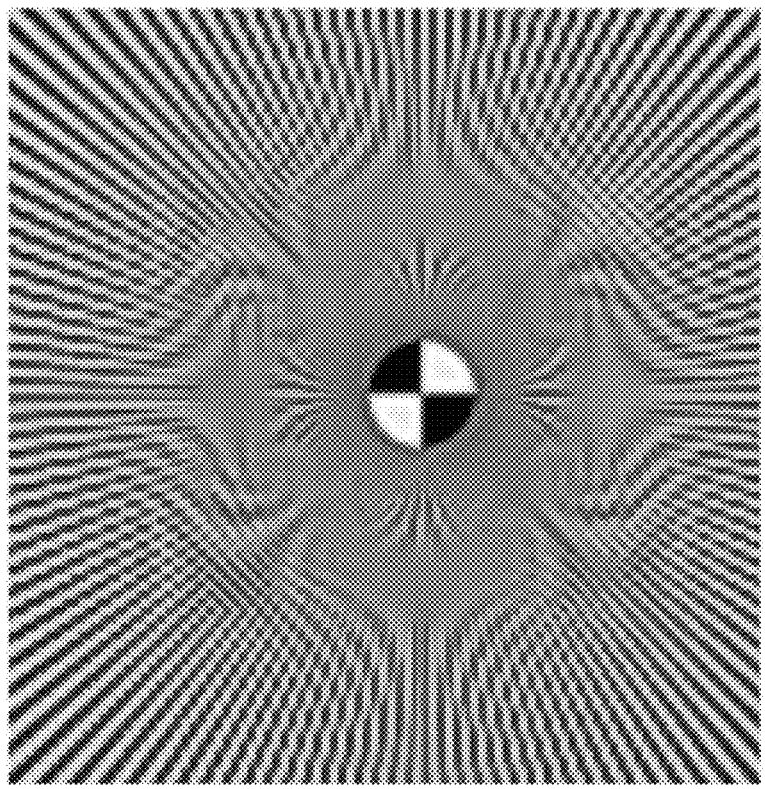
FIG. 11 is a diagram illustrating an output image after performing an isosceles pixel binning on the red pixels and the blue pixels according to an example embodiment of the disclosure.

FIG. 10 is a diagram illustrating an output image after performing a rhombus pixel binning on the green pixels according to an example embodiment of the disclosure. FIG. 11 is a diagram illustrating an output image after performing an isosceles pixel binning on the red pixels and the blue pixels according to an example embodiment of the disclosure.

Referring to FIG. 10, the false color and the zigzag-shaped noise may be reduced or alleviated at the green sampling point after the rhombus pixel binning according to an example embodiment of the disclosure. Referring to FIG. 11, the false color and the zigzag-shaped noise may be reduced or alleviated at the red sampling point and the blue sampling point after the isosceles pixel binning according to an example embodiment of an operating method of the image sensor 100.

Figure 12:
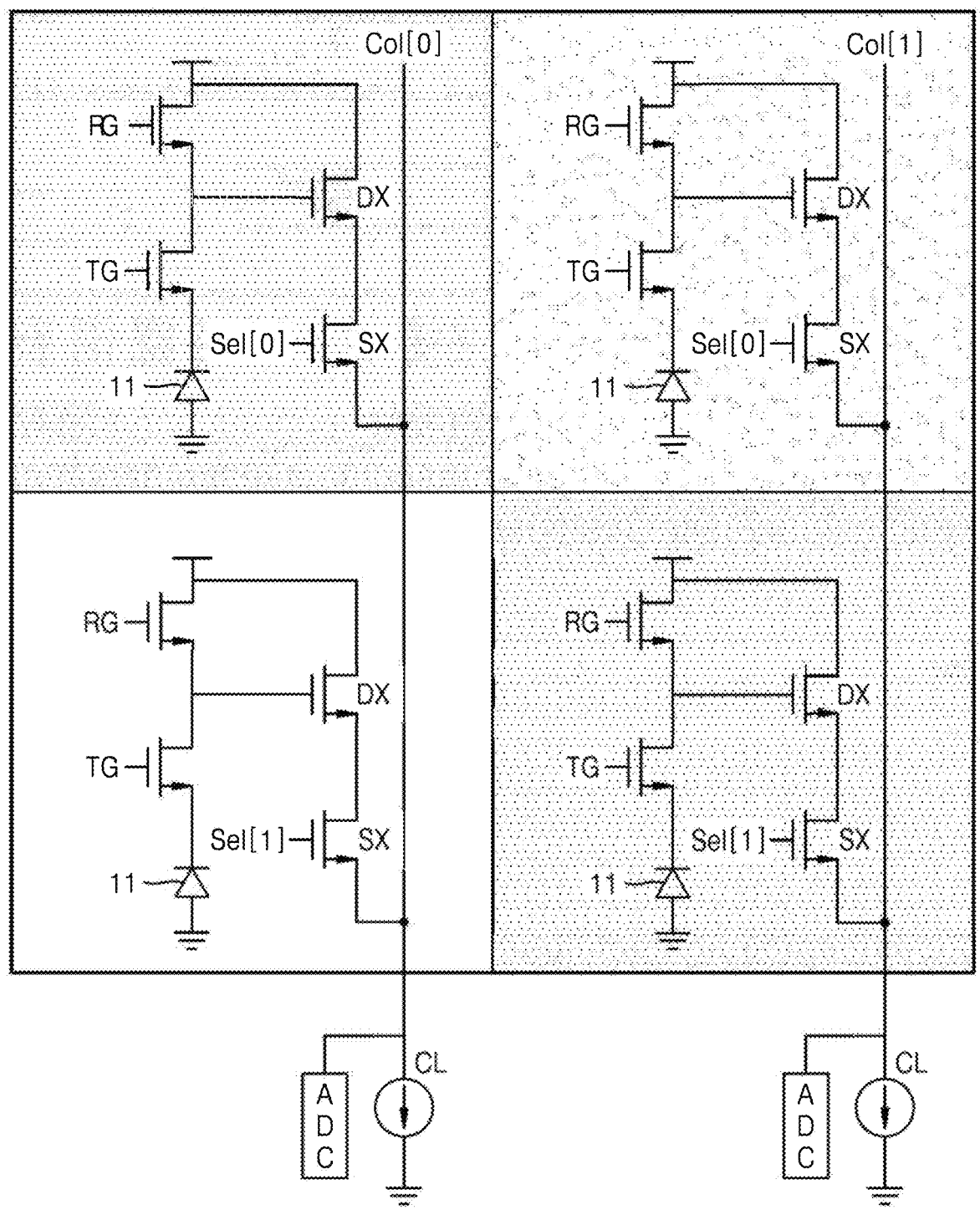
FIG. 12 is a circuit diagram of the pixels of the pixel array according to an example embodiment of the disclosure.

FIG. 12 is a circuit diagram of the pixels of the pixel array according to an example embodiment of the disclosure.

Referring to FIG. 12, the pixel PX may include a photo-electric conversion element 11 and the circuit of the pixel PX may include a plurality of transistors, such as a transfer transistor TG, a driving transistor DX, and a switching transistor SX. A selection signal Sel for selecting the pixel PX may be transferred to the switching transistor SX.

In addition, the pixel PX may further include a readout unit such as an ADC circuit. A pixel row may be selected by the row driver, and the ADC circuit may receive a plurality of pixel signals that may be read out from the pixels PX in the selected pixel row. Then, the analog pixel signals may be converted to digital pixel values, respectively, by the ADC circuit. In addition, a plurality of pixel signals may be detected from the pixel array through a plurality of column lines CL and the ADC circuit may convert the pixel signals into digital data based on the ramp signals RAMP generated from the ramp signal generator. Thus, the ADC circuit may generate and transfer the first image data or the raw image data by the pixel row.

The column line CL may extend in a vertical direction, and a plurality of pixels PX vertically extending around the column line CL may be connected to the neighboring column line CL. A plurality of column lines CL may be arranged at the same gap distance in a horizontal direction substantially perpendicular to the vertical direction. In addition, the pixel signals, such as reset signals and sensing signals that may be generated from the pixels PX by the pixel row may be transferred to the ADC circuit through the corresponding column line Col[0] or Col[1].

Figure 13:
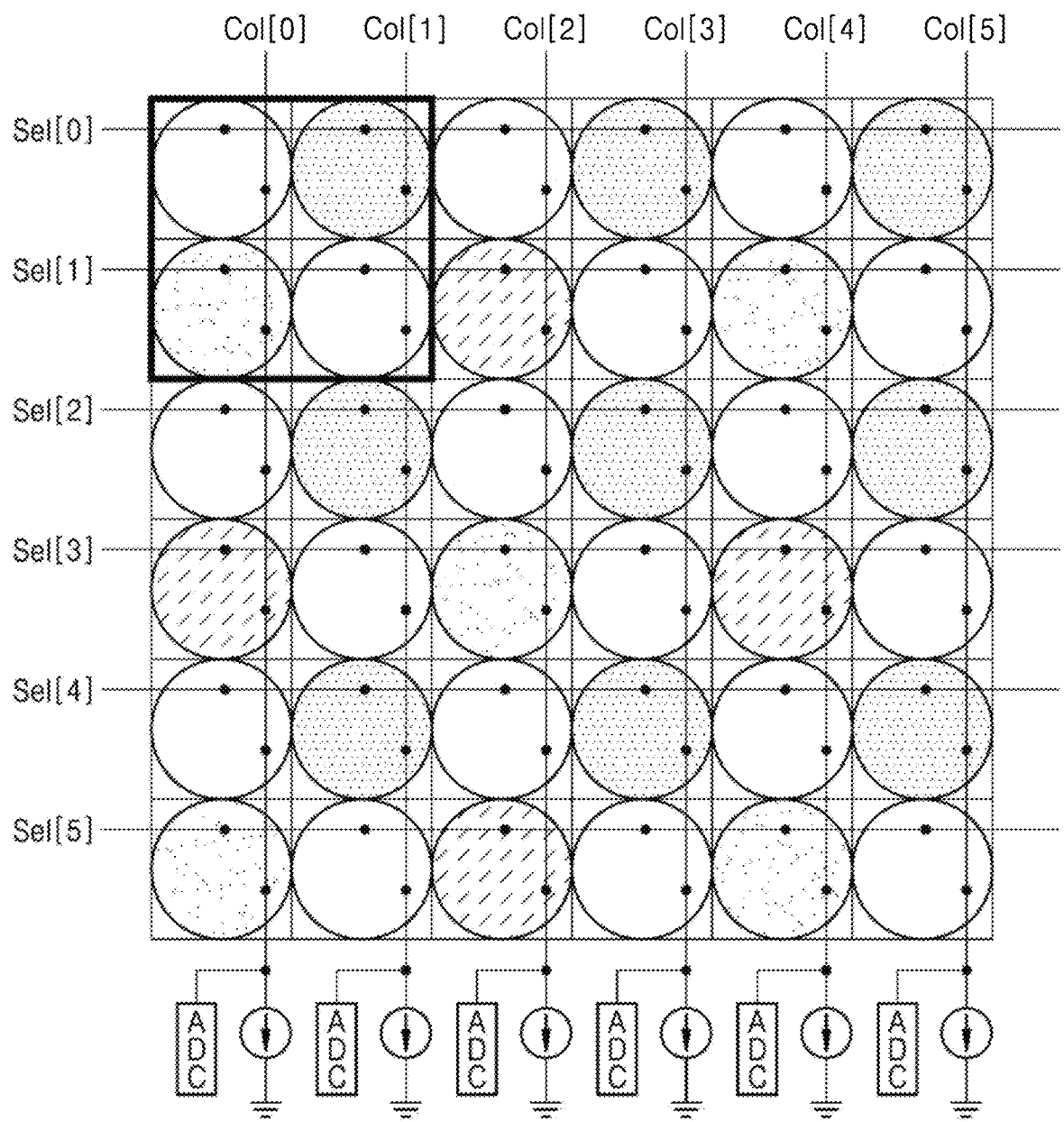
FIGS. 13 and 14 are diagrams illustrating a process of generating the binning areas in the pixel array and reading out pixel signals from the pixel array according to an example embodiment of the disclosure.
Figure 14:
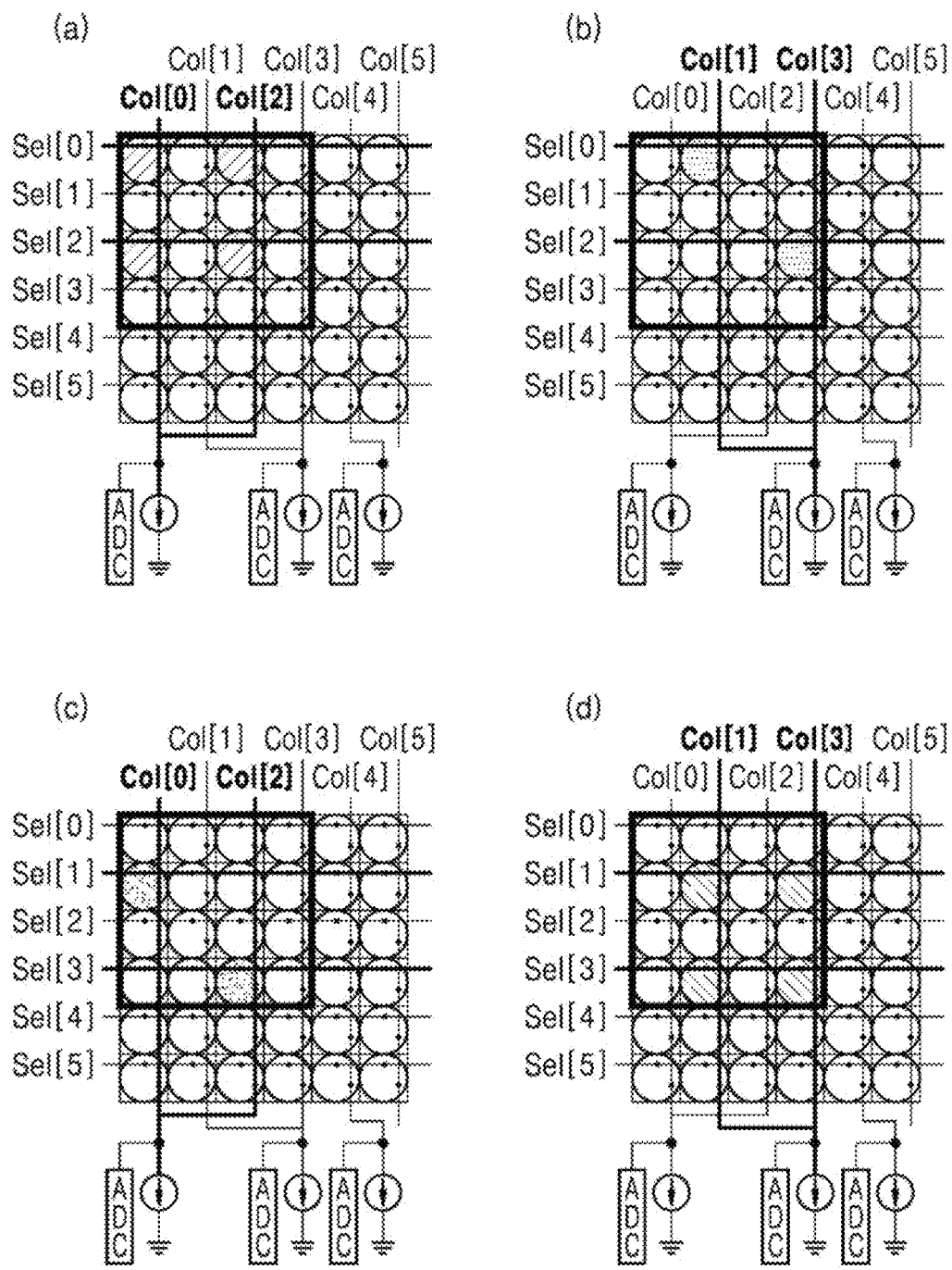

FIGS. 13 and 14 are diagrams illustrating a process of generating the binning areas in the pixel array and reading out pixel signals from the pixel array according to an example embodiment of the disclosure.

Referring to FIG. 13 and (a), (b), (c) and (d) of FIG. 14, a selection line Sel and a column line Col may be connected to each of the pixels according to the binning area, thus the pixel data may be obtained pixel-by-pixel in the binning area.

Referring to FIG. 13, each pixel of the pixel array may be electrically connected to a plurality of selection lines Sel[0] to Sel[5] and a plurality of selection lines Sel[0] to Sel[5]. Each of the column lines Col[0] to Col[5] may be connected to its own current source and ADC circuit. The number of selection lines and the number of column lines is not limited to the numbers thereof illustrated in FIGS. 13 and 14.

The views of (a) and (d) of FIG. 14 illustrate operations of performing square pixel binning on the white pixels according to an example embodiment of the disclosure. Referring to (a) of FIG. 14, two selection lines Sel[0] and Sel[2] and two column lines Col[0] and Col[2] may be selected, to thereby generate the square white binning area. The two selection lines Sel[0] and Sel[2] may be selected in such a configuration that one pixel may be positioned between two selection lines Sel[0] and Sel[2]. The two column lines Col[0] and Col[2] may be selected in such a configuration that one pixel may be positioned between two column lines Col[0] and Col[2]. When completing the selection of the selection lines Sel[0] and Sel[2] and the column lines Col[0] and Col[2], the first to fourth white pixels may be positioned at four cross points of two selection lines Sel[0] and Sel[2] and two column lines Col[0] and Col[2]. Thus, the white binning area may be generated into a shape of a square in such a configuration that the first to fourth white pixels may be positioned at corners of the square, respectively. Thereafter, the pixel binning may be performed on the square-shaped white binning area. Referring to (d) of FIG. 14, other two selection lines Sel[1] and Sel[3] and other two column lines Col[1] and Col[3] may be selected different from the selection lines Sel[0] and Sel[2] and the column lines Col[0] and Col[2] as shown in (a) of FIG. 14, as will be understood by one of ordinary skill in the art from the disclosure herein.

The view of (b) of FIG. 14 illustrates an operation of performing diagonal pixel binning on the green pixels according to an example embodiment of the disclosure. Referring to (b) of FIG. 14, two selection lines Sel[0] and Sel[2] and two column lines Col[1] and Col[3] may be selected, to thereby generate the diagonal green binning area. Two selection lines Sel[0] and Sel[2] may be selected in such a configuration that one pixel may be positioned between two selection lines Sel[0] and Sel[2]. Two column lines Col[1] and Col[3] may be selected in such a configuration that one pixel may be positioned between two column lines Col[1] and Col[3]. When completing the selection of the selection lines Sel[0] and Sel[2] and the column lines Col[1] and Col[3], the first green pixel and the second green pixel may be positioned at cross points of two selection lines Sel[0] and Sel[2] and two column lines Col[1] and Col[3] in a diagonal direction. Thus, the green binning area may be generated into a shape of a diagonal line. Thereafter, the pixel binning may be performed on the diagonal green binning area.

The view of (c) of FIG. 14 illustrates an operation of performing diagonal pixel binning on the red pixels according to an example embodiment of the disclosure. Referring to (c) of FIG. 14, two selection lines Sel[1] and Sel[3] and two column lines Col[0] and Col[2] may be selected, to thereby generate the diagonal red binning area. Two selection lines Sel[1] and Sel[3] may be selected in such a configuration that one pixel may be positioned between the selection lines Sel[1] and Sel[3]. Two column lines Col[0] and Col[2] may be selected in such a configuration that one pixel may be positioned between two column lines Col[0] and Col[2]. When completing the selection of the selection lines Sel[1] and Sel[3] and the column lines Col[0] and Col[2], the first red pixel and the second red pixel may be positioned at cross points of two selection lines Sel[1] and Sel[3] and two column lines Col[0] and Col[2] in a diagonal direction. Thus, the red binning area may be generated into a shape of diagonal line. Thereafter, the pixel binning may be performed on the diagonal red binning area.

Although the disclosure been described in connection with some embodiments illustrated in the accompanying drawings, it will be understood by one of ordinary skill in the art that variations in form and detail may be made therein without departing from the spirit and essential feature of the disclosure. The above disclosed embodiments should thus be considered illustrative and not restrictive.

What is claimed is:

1. A method of operating an image sensor comprising a pixel array of a plurality of red pixels, a plurality of green pixels, a plurality of blue pixels, and a plurality of white pixels, the method comprising:
   selecting a first green pixel and a second green pixel arranged on a first axis parallel to a first diagonal direction, wherein a first non-green pixel and non-white pixel is arranged between the first green pixel and the second green pixel on the first axis;
   selecting a third green pixel and a fourth green pixel arranged on a second axis parallel to a second diagonal direction, wherein a second non-green pixel and non-white pixel is arranged between the third green pixel and the fourth green pixel on the second axis;
   generating a first green binning pixel by performing a first diagonal binning operation on the first green pixel and the second green pixel;
   generating a second green binning pixel by performing a second diagonal binning operation on the third green pixel and the fourth green pixel; and
   generating image data corresponding to the first green binning pixel and the second green binning pixel.

2. The method of claim 1, further comprising:
   selecting a first red pixel and a second red pixel arranged on an third axis parallel to the first diagonal direction;
   generating a red binning pixel by performing a diagonal binning operation on the first red pixel and the second red pixel; and
   generating image data corresponding to the red binning pixel.

3. The method of claim 1, further comprising:
   selecting a first blue pixel and a second blue pixel arranged on a third axis parallel to the second diagonal direction;
   generating a blue binning pixel by performing a fourth diagonal binning operation on the first blue pixel and the second blue pixel; and
   generating image data corresponding to the blue binning pixel.

4. The method of claim 1, further comprising:
generating a square binning area by selecting a first white pixel, a second white pixel, a third white pixel, and a fourth white pixel that are positioned at corners of a square; and
generating a white binning pixel by performing a square pixel binning operation on the square binning area.

5. The method of claim 1, further comprising:
comparing a color of first image data with a color of second image data pixel-by-pixel, the first image data being generated from pixels of the pixel array in the second diagonal direction prior to the first diagonal binning operation and the second diagonal binning operation, and the second image data being generated from the first green binning pixel and the second green binning pixel generated after the first diagonal binning operation and the second diagonal binning operation; and
selecting mismatch points of the first green binning pixel and the second green binning pixel at positions at which the color of the second image data is different from the color of the first image data.

6. The method of claim 5, further comprising:
generating output image data from the first green binning pixel and the second green binning pixel excluding the mismatch points, based on the mismatch points being found among binning pixels in the second diagonal direction.

7. The method of claim 1, further comprising:
generating a white binning area in a shape of a square by selecting white pixels in a shape of 2n by 2n pixel matrix, wherein n is a natural number; and
generating a plurality of white binning pixels by performing a white pixel binning operation on the square-shaped white binning area.

8. The method of claim 7, further comprising:
reading out pixel signals from half of the plurality of white binning pixels.

* * * * *